(12) United States Patent
Okuno et al.

(10) Patent No.: US 6,546,161 B2
(45) Date of Patent: Apr. 8, 2003

(54) NO POLARIZATION DEPENDENT WAVEGUIDE TYPE OPTICAL CIRCUIT

(75) Inventors: Masayuki Okuno, Ibaraki (JP); Akira Himeno, Ibaraki (JP); Yoshinori Hibino, Ibaraki (JP); Yasuyuki Inoue, Ibaraki (JP)

(73) Assignee: Nippon Telegraph and Telephone Corporation (JP)

( * ) Notice: Subject to any disclaimer, the term of this patent is extended or adjusted under 35 U.S.C. 154(b) by 232 days.

(21) Appl. No.: 09/761,628

(22) Filed: Jan. 17, 2001

(65) Prior Publication Data
US 2001/0009595 A1 Jul. 26, 2001

(30) Foreign Application Priority Data
Jan. 21, 2000 (JP) .................................. 2000-013029

(51) Int. Cl.⁷ .................. G02B 6/12; G02B 6/10; G02B 6/00; G02B 6/26
(52) U.S. Cl. .............. 385/14; 385/129; 385/130; 385/131; 385/11; 385/28
(58) Field of Search .................... 385/14, 11, 28, 385/29, 42, 39, 40, 129, 130, 131, 41

(56) References Cited

U.S. PATENT DOCUMENTS 5,694,496 A * 12/1997 Ando et al. .................. 385/11
6,072,920 A * 6/2000 Ando et al. .................. 385/11
6,115,514 A * 9/2000 Ando et al. .................. 385/11

FOREIGN PATENT DOCUMENTS

| JP | 627339 | 4/1992 |
| JP | 4241304 | 8/1992 |
| JP | 756199 | 3/1995 |
| JP | 926516 | 1/1997 |

* cited by examiner

Primary Examiner—Georgia Epps
Assistant Examiner—Jack Dinh
(74) Attorney, Agent, or Firm—Ostrolenk, Faber, Gerb & Soffen, LLP

(57) ABSTRACT

A no polarization dependent waveguide type optical circuit can resolve polarization dependency completely and can reduce reflected return light. An intermediate portion of the two connecting waveguides are formed with S-shaped waveguides of the same shape consisted of respectively two curved waveguides or two curved waveguides and straight waveguides connecting the curved waveguides. One polarization mode converter is provided in a groove formed across the S-shaped waveguide, and a perpendicular line to an incident surface of light of the polarization mode converter and the S-shaped waveguide forms an angle greater than 0°.

16 Claims, 17 Drawing Sheets

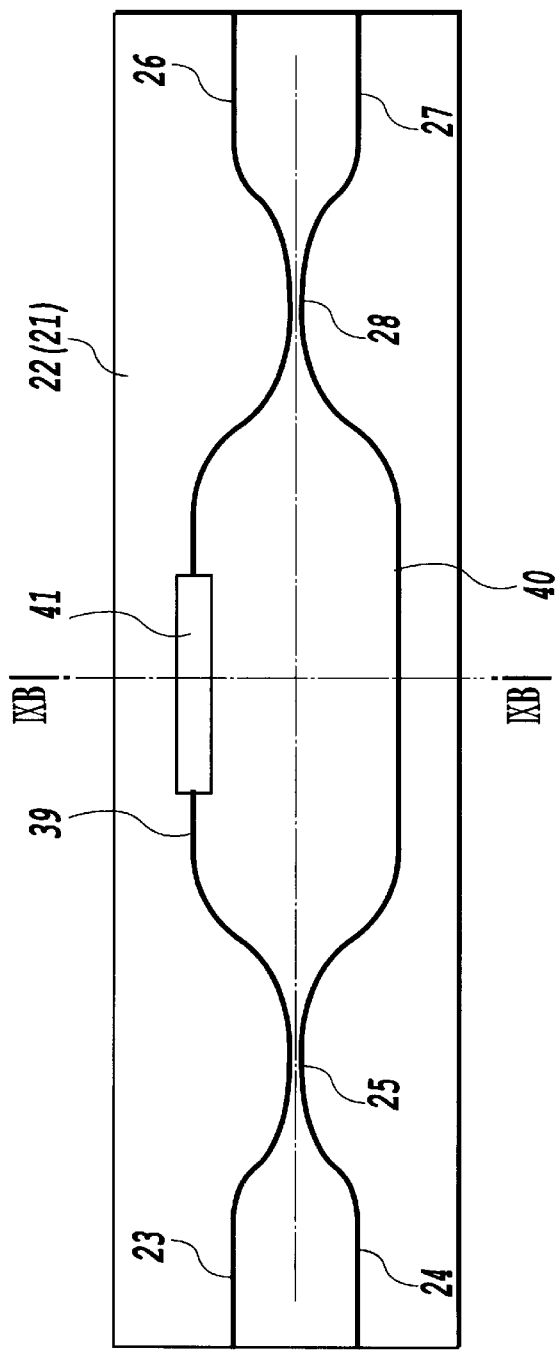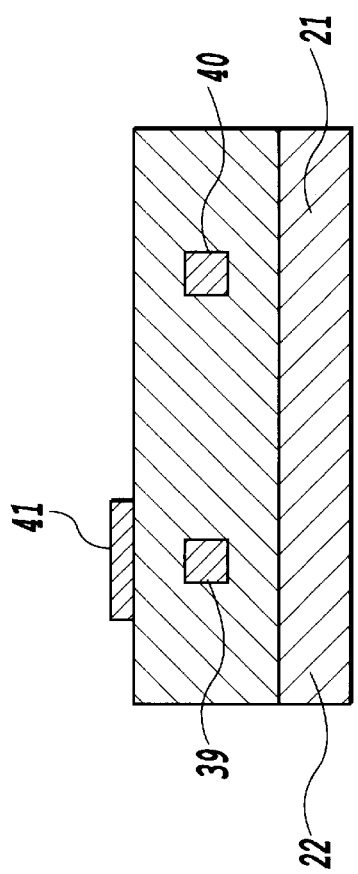
FIG.9A
FIG.9B

NO POLARIZATION DEPENDENT WAVEGUIDE TYPE OPTICAL CIRCUIT

This application is based on Japanese Patent Application No. 2000-13029 filed Jan. 21, 2000, the content of which is incorporated hereinto by reference.

BACKGROUND OF THE INVENTION

1. Field of the Invention

The present invention relates generally to a waveguide type optical circuit to be employed in construction of an optical communication system, an optical information processing system and so forth. More particularly, the invention relates to a technology effective in application for a no polarization wave dependent waveguide type optical circuit having no polarized wave dependency.

2. Description of the Related Art

Conventionally, associating with development of an optical communication technology, research and development has been made for various optical parts. Amongst, a waveguide type optical parts based on an optical waveguide on a flat substrate is the most important part. The reason is that the waveguides type optical part has a feature to be easily manufactured with high reproductivity achieving a precision less than or equal to an optical wavelength by a photolithographic technology and fine machining technology.

For example, a waveguide type Mach-Zehnder interferometer optical circuit is constructed with two optical couplers on the substrate and two connection waveguides connecting connecting these two optical coupler. By controlling optical path length difference and interference between two waveguide type phase condition, various functions can be realized. Such optical circuit has wide application fields, and has been put into practical use.

FIGS. 9A and 9B show an example of the conventional waveguide type Mach-Zehnder interferometer. FIG. 9A is a plan view and FIG. 9B shows a section taken along line IXB—IXB in FIG. 9A.

As shown in FIG. 9A, the Mach-Zehnder interferometer is constructed with a first input waveguide 23 and second input waveguide 24 formed in a clad 22 of a silicon substrate; 21, a first directional coupler 25 formed by placing the first input waveguide 23 and the second input waveguide 24 to be proximal with each other, a first output waveguide 26 and a second output waveguide 27, a second directional coupler 28 formed by placing the first output waveguide 26 and the second output waveguide 27 proximal with each other, first connecting waveguide 39 and second connecting waveguide 40 connecting the first directional coupler 25 and second directional coupler 28, and a thermo-optic phase shifter 41 (thin film heater) As a material for forming the optical waveguide, a fused silica prepared by way of flame hydrolysis deposition is used. As shown in FIG. 9B, the section is that a core having a section of 7 $\mu m \times 7$ $\mu m$, for example the first connecting waveguide 39 and the second connecting waveguide 40, is embedded at substantially center portion of a clad 22 of 50 $\mu m$ thick deposited on the silicon substrate 21. A difference of refraction indexes of the clad and the core is 0.75%.

As the first directional coupler 25 and the second directional coupler 28, it is typical to employ 3 dB coupler set a branching ratio of 1:1. A light input from the input waveguide is equally divided by the first directional coupler 25 and propagated to the first connecting waveguide 39 and the second connecting waveguide 40. The light propagated to the first connecting waveguide 39 and the second connecting waveguide 40 are combined to cause mutual interference in the second directional coupler 28. The light combined by the second directional coupler 28 is variable of amont of light to be output to the first output waveguide 26 and the second output waveguide 27 respectively depending upon phase condition at that time. For example, when a light having a wavelength $\lambda$ from the first input waveguide 23 is equally divided by the first directional coupler 25 and combined in the second directional coupler 28, if the phase error of two lights is 0 or an integer multiple of the wavelength $\lambda$, the combined light is output from the second output waveguide 27. On the other hand, when the phase error of the combined two lights is odd number multiple of the half-wavelength ($\lambda/2$), the combined light is output from the first output waveguide 26. Furthermore, when the phase error of the combined light is the intermediate condition of the condition set forth above, namely when the phase error is neighter 0, integer multiple of the wavelength $\lambda$ nor odd number multiple of the half wavelength, the light is output from both of the first output waveguide 26 and the second output waveguide 27 at a ratio depending upon the instantaneous condition.

Assuming an optical path length difference between the first connecting waveguide 39 and the second connecting waveguide 40 is $\Delta L$, the Mach-Zehnder interferometer, as shown in FIG. 9A, in which the optical path length-difference $\Delta L$ is 0 or approximately half wavelength of the wavelength of the light may operate as an optical attenuator or an optical switch by providing a thin film header operating as thermo-optic phase shifter 41 on the first connecting waveguide 39.

FIG. 10 is an illustration for explaining characteristics of the conventional Mach-Zehnder interferometer optical circuit, in which may operate thermo-optic phase shifter 41 in case of the optical path length difference $\Delta L$ is 0. When thermo-optic phase shifter 41 may not operate, a light input from the first input waveguide 23 output from the second output waveguide 27. Thus, when the optical path length is effectively increased by heating the first connecting waveguide 39 by operating the thermo-optic phase shifter 41 (thin film heater) to increase refraction index of the first connecting wave guide 39 by thermo-optic effect, a part of the incident light from the first input waveguide 23 is output to the first connecting waveguide 39. When the optical path length difference $\Delta L$ becomes half wavelength by adjusting a temperature of the first connecting waveguide 39, all of the incident light from the first input waveguide 23 is output to the first output waveguide 26. Thus, by variably adjusting the optical path length difference $\Delta L$ of two connecting waveguides from 0 to have wavelength using the thermo-optic phase shifter 41, it becomes possible to operate as the optical attenuator. On the other hand, by using the optical path length difference $\Delta L$ of two connecting waveguides only at 0 and half wavelength, it can be operated as special optical switch. An electrical power required for switching by the optical switch is about 0.5 W in case the thin film heater of 5 mm length and 50 $\mu m$ width. On the other hand, a temperature elevation of the thin film feature is about 30° C.

The Mach-Zehnder interferometer optical circuit having the optical path length difference $\Delta L$ of two connecting waveguides greater than or equal to several $\mu m$, it can be operated as a wavelength filter. FIG. 11 is a plan view showing a general construction of the asymmetric Mach-Zehnder interferometer optical circuit. The asymmetric Mach-Zehnder interferometer optical circuit is constructed with the first input waveguide 23 and second input waveguide 24 fabricated on the clad 22 on the silicon substrate 21, a first directional coupler 25 formed by placing the first input waveguide 23 and the second input waveguide 24 to be proximal with each other, 1o the first output waveguide 26 and a second output waveguide 27, the second directional coupler 28 formed by placing the first output waveguide 26 and the second output waveguide 27 proximal with each other, first connecting waveguide 39 and second connecting waveguide 40 connecting the first directional coupler 25 and second directional coupler 28. As a material for forming the optical waveguide, a fused silica prepared by way of flame hydrolysis deposition is used. As shown in FIG. 9B, the section is that a core having a section of 7 $\mu$m×7 $\mu$m, for example the first connecting waveguide 39 and the second connecting waveguide 40, is embedded at substantially center portion of a clad 22 of 50 $\mu$m thick deposited on the silicon substrate 21. A difference of refraction indexes of the clad and the core is 0.75%. For example, among incident light from the first input waveguide 23, the light having wavelength, at which the optical path length difference $\Delta L$ between the connecting waveguides is just 2N times (N is integer) of the wavelength, is output from the second output waveguide 27, and in case of 2(N−1) times, output from the first output waveguide 26. For example, when the optical path length difference $\Delta L$ is about 1.48 mm it operates as a wavelength filter having a period of 200 GHz (1.6 nm in wavelength). FIG. 12 is a conceptual illustration of the wavelength characteristics in the case used as the wavelength filter.

Here, as shown in FIGS. 10 and 12, in case of the Mach-Zehnder interferometer optical circuit, the electric power of the thermo-optic phase shifter 41 and the switching power to obtain the same attenuation amount is variable depending upon condition of polarization of the incident light from the input waveguide, in the case of the optical attenuator or the optical switch having the optical path, length difference $\Delta L$ of 0 or about half wavelength. In case of the wavelength filter having greater $\Delta L$, the period of the wavelength and the position of the peak (wavelength) are variable. This is the reason set forth below.

Namely, in case of the optical attenuator or the optical switch having the optical path length difference $\Delta L$ of 0 or about half wavelength, it is the cause in that optical effect of the thermal stress generated by the thermo-optic phase shifter is differentiated depending upon respective polarization. More particularly, the foregoing is cased by the following mechanism. When the thermo-optic phase shifter is operated, the generated heat is diffused to the circumference, and tends to propagate in substance having high thermal conductivity. Thermal conductivity of air is 2.61×10−4 W/(cm.deg), and thermal conductivity of the glass waveguide forming the Mach-Zehnder interferometer optical circuit is 0.014 W/cm.deg), and the thermal conductivity of the silicon substrate is 1.70 W/cm.deg), the heat generated in the thermo-optic phase shifter 41 is diffused mainly in the glass waveguide to be transmitted to the silicon substrate 21. Since the thermal conductivity of the silicon substrate 21 is quite high, the heat flows substantially perpendicularly to the silicon substrate 21 and a little heat is diffused to the circumference. Therefore, the connecting waveguide immediately below the thermo-optic phase shifter 41 is efficiently heated and the circumference thereof is locally expanded.

The glass waveguide is subject to large compression stress in horizontal direction with respect to the silicon substrate due to different of thermal expansion coefficients in comparison with the silicon substrate in the process of fabrication of the waveguide, in which the glass waveguide is once heated at a temperature higher than or equal to 1000° C. and then cooled up to the normal temperature. Accordingly, the locally expanded peripheral portion of the connecting waveguide receives new compression stress from the silicon substrate in a direction parallel to the substrate. Therefore, in addition to variation of the refraction index due to temperature elevation, variation of the refraction index due to the compression stress is caused. Variation of the refraction index due to variation of the compression stress due is referred to as photoelastic effect and is expressed by the following equation (1).

$$\Delta nTE=(\Delta nx)=C1\Delta\sigma xx+C2(\Delta\sigma yy+\Delta\sigma zz)$$

$$\Delta nTM=(\Delta ny)=C1\Delta\sigma yy+C2(\Delta\sigma xx+\Delta\sigma zz)$$

Wherein x is a direction parallel to the silicon substrate, y is a direction perpendicular to the silicon substrate, z is a waveguide direction of the light, $\Delta\sigma xx$, $\Delta\sigma yy$, $\Delta\sigma zz$ are respective stress variation amount in x direction, y direction and z direction, in which tensile stress is expressed by positive value. $\Delta nTE$ is a refraction index sensed by a light having electric field component in x direction parallel to the silicon substrate (hereinafter referred to as TE mode light), $\Delta nTM$ is a refraction index sensed by a light having magnetic field component in x direction parallel to the silicon substrate (hereinafter referred to as TM mode light), C1 and C2 are photoelastic coefficient of fused silica, C1=−0.74× $10^{-5}$ mm$^2$·kg, C2=−4.1×$10^{-5}$ mm$^2$·kg.

As can be seen from the foregoing equation 1, when a compression stress is applied in a direction parallel to the silicon substrate, stress variation $\Delta\sigma xx$ is caused to increase refraction index of the glass waveguide, At this time, variation amount of the refraction index is different between the TE mode light and the TM mode light for difference of the photoelastic coefficients C1 and C2. Variation amount $\Delta nTM$ of the TM mode light is greater than the variation amount $\Delta nTE$ of the TE mode light. Namely, when the thermo-optic phase shifter 41 is driven, in addition to variation of refraction index due to thermo-optic effect, by variation of the refraction index due to local thermal stress, variation of the refraction index of the TM mode light becomes greater than that of the TE mode light so that optical variation of the TM mode light is progressed more quickly than the TE mode light. A drive power of the thermo-optic phase shifter 41 to have the same optical output is smaller than the TM mode light in the extent of about 4%. Accordingly, by employing the Mach-Zehnder.interferometer optical circuit having the optical path-length difference $\Delta L$ of two connection waveguide as variable optical attenuator to attenuate the TE mode light for 10 dB, the TM mode light is attenuated about 11.5 dB to differentiate attenuation amount depending upon variation of polarization surface of the incident light of the optical attenuator.

On the other hand, in case of the Mach-Zehnder interferometer optical circuit having large the optical path length difference $\Delta L$ of the connection waveguide, effective optical path length difference between the connection waveguide is expressed by the following equation (2):

$$\Delta L=\Delta l\cdot n$$

In the foregoing equation 2, $\Delta l$ is a physical optical path length difference of the connection waveguide, n is the refraction index of the connection waveguide. Due to large compression stress in x direction exerted from the silicon substrate 21, the refraction index of the waveguide is expressed by the following equations (3)

$$nTE = n0 + \Delta nTE$$

$$nTM = n0 + \Delta nTM$$

In the foregoing equations (3), n0 is a refraction index of the waveguide when no stress is applied, ΔnTE and ΔnTM are respectively variation amount of refraction indexes of the TE mode and the TM modes due to stress obtained from the foregoing equation (1).

Comparing the variation amount ΔnTe of refraction index of the TE mode light and the variation amount ΔnTM of the refraction index of the TM mode light, the variation amount ΔnTM of the refraction index of the TM mode light is greater. Therefore, the optical path length difference between the connection waveguides is effectively greater in the TM mode light than the TE mode light. When the optical circuit is employed as the wavelength filter, the wavelength λ in outputting the incident light from the first input waveguide 23 to the second output waveguide 27 satisfies the following equation (4):

$$\Delta L = 2N\lambda$$

wherein N is integer.

Since variation amount ΔnTE of the refraction index of the TE mode light and the variation amount ΔnTM of the refraction index of the TM mode light are different in values, the wavelength to be output is different depending upon polarization condition of the incident light. On the other hand, a difference Δλ between the period the wavelength to output, namely wavelength to output and the shut off wavelength is expressed by the following equation (5):

$$\Delta\lambda = \lambda^2 / 2n\Delta l$$

For example, assuming that the physical optical path length difference Δl of the connecting waveguide is 20.4 mm and the wavelength λ of the incident light is 1.55 μm, the period Λ of the wavelength becomes 0.4 nm from the foregoing equation (5). However, since the refraction index is different depending upon polarization condition, the period is differentiated depending upon the polarization condition. From these reason, even if a light of certain wavelength can be separated in the TE mode, for example, the TM mode light cannot be separated.

As a solution for this problem, there is a method to insert a half-wave plate at the center of two connection waveguides of the Mach-Zehnder interferometer optical circuit. By this, the incident light in the TE mode is converted into the TM mode at the intermediate position of the connection waveguide, and the incident light of TM mode is converted into TE mode. Therefore, for incident light of either polarization, the connection waveguide is effectively the same length. Therefore, polarization dependency can be resolved.

FIG. 13 shows an example of the no polarization dependent waveguide type Mach-Zehnder interferometer optical circuit resolving the polarization dependency by insertion of the half-wave plate. The Mach-Zehnder interferometer optical circuit shown in FIG. 13 is constructed with a first input waveguide 23 and second input waveguide formed in a clad 22 of a silicon substrate 21, the first output waveguide 26 and the second output waveguide 27, the first directional coupler 25 and the second directional coupler 28, first connecting wave guide 39A, first connecting wave guide 39B, second waveguide 40A, second waveguide 40B and thermo-optic phase shifter 41A and thermo-optic phase shifter 41B (thin film heater) and thin film type half-wave plate 32 inserted into the half-wave plate receptacle groove 31 formed at the center of the optical path of each connecting waveguide. As the first directional coupler 25 and the second directional coupler 28, 3 dB coupler is employed.

In fabrication of the half-wave plate receptacle groove 31, reactive ion etching or machining, such as dicing saw and so forth is employed. After insertion into the half-wave plate receptacle groove 31, the thin film type half-wave plate 32 is fixed by optical bond or the like. The half-wave plate may be a crystal, such as calcite. However, since the thickness becomes about 100 μm including the glass substrate holding the crystal to have large loss. Therefore, it is typical to use the thin film type half-wave plate 32 as thin film provided birefringency by drawing a polyimide film. As a result, while loss is slightly increased, as optical characteristics of the Mach-Zehnder interferometer optical circuit, an average value of the TE mode light and the TM mode light as shown in FIGS. 10 and 12 is obtained to resolve polarization dependency.

While the foregoing description has been given for the Mach-Zehnder interferometer optical circuit, similar effect can be expected even in other circuit, such as arrayed waveguide grating optical circuit. FIG. 15 shows an example of no polarization dependency arrayed waveguide grating optical circuit resolving the polarization dependency. The arrayed waveguide grating optical circuit is constructed with an input waveguide cluster 34, a output waveguide cluster 36, a first slab waveguide 35, a second slab waveguide 37, the half-wave plate receptacle groove 31, the thin film type half-wave plate 32, a first arrayed waveguide 42A and a second arrayed waveguide 42B between the first slab waveguide 35 and the second slab waveguide 37.

The first arrayed waveguide 42A and the second arrayed waveguide 42B are provided a given optical path length difference ΔL between adjacent waveguides. A light of certain wavelength incided from the input waveguide cluster 34 is diffracted at an inlet of the first slab waveguide 35 to spread in the first slab waveguide 35 and output to the first arrayed waveguide 42A. The light propagated to the first arrayed waveguide 42A and the second arrayed waveguide 42B reaches the second slab waveguide 37. However, since the given optical path length difference ΔL is provided between adjacent waveguides in the arrayed waveguide, the light reaches the second slab waveguide 37 with a phase difference corresponding to the optical path length difference. The light entering into the second slab waveguide 37 is diffracted and spread. However, the light output from respective arrayed waveguides interfere with each other to diffract toward a direction (diffraction angle) where wave surface of light is arranged as a whole, to converge at a connecting portion with the output waveguide. By arranging the output waveguide at this position, the light of the wavelength set forth above can be branched. Since velocity of the light is variable depending upon wavelength, the phase difference provided by the arrayed waveguide is different to differentiate the convergence position depending upon the wavelength. Namely, the by connecting the output waveguide cluster 36 aggregating the output waveguides at the convergence position of the lights of respective wavelengths to the second slab waveguide 37, the lights of different wavelengths can be output from respective output waveguides.

Here, the effective optical path length difference ΔL of the arrayed waveguide is different in the TE mode wave and the TM mode wave due to compression stress exerted by the silicon substrate. Accordingly, the wavelength output to certain output waveguide is differentiated by polarization condition. Therefore, by inserting the thin film type half-wave plate 32 at the intermediate position in the arrayed waveguide, the optical path length differences of the arrayed waveguide can be made equal for either polarized light.

The method for resolving polarization dependency by inserting the half-wave plate is a method applicable for other optical circuit, such as ring resonator, directional coupler and so forth.

However, in the prior art, in order to remove polarization dependency by the thin film type half-wave plate 32, the thin film type half-wave plate 32 has to be inserted strictly at the center of axial symmetry. Thus, it is typical to layout the optical circuit with maintaining axial symmetry. Accordingly, the half-wave plate receptacle groove 31 is formed perpendicularly with respect to respective connection waveguides. When the thin film type half-wave plate 32 is inserted in the half-wave plate receptacle groove 31 and fixed by optical bond, due to difference of refraction indexes between the glass waveguide and the optical bond and between the optical bond and the half-wave plate, a part of the light propagated through respective connection waveguides can be reflected to return toward the input waveguide side. Hereinafter, the light returning to the input waveguide side will be hereinafter referred to as reflected return light. For example, a spectrum of the reflected return light in the arrayed waveguide grating optical circuit shown in FIG. 15, is shown in FIG. 17. From FIG. 17, it can be seen that −35 dB of light at the maximum is reflected toward the incident port. The reflected return light can provide adverse effect for the system employing this device. For example, when the reflected return light returns to a semiconductor laser, an output intensity of he laser may be fluctuated to make the system unstable.

On the other hand, it is possible to reduce the reflected return light by obliquely forming the groove 31 for receiving the λ/2 plate with respect to an axis of symmetry, as shown in FIGS. 14 and 16. However, in such case, the axial symmetry is destroyed to make it impossible to completely resolve the polarization dependency of the optical circuit.

SUMMARY OF THE INVENTION

The present invention has been worked out in view of the shortcoming set forth above. It is therefore an object of the present invention to provide a no polarization dependent waveguide type optical circuit which can completely resolve polarization dependency and can reduce reflected return light.

To achieve the above objective, the present invention according to a first aspect provides a no polarization dependent waveguide type optical circuit including one or more input waveguides formed on a substrate, a first optical coupler connected to the input waveguide, one or more output waveguides, a second optical coupler connected to the output waveguides, a plurality of connecting waveguide connecting the first optical coupler and the second optical coupler forming an optical circuit, and a polarization mode converter provided at a center of an optical path of the connecting waveguide of the optical circuit and converting a horizontally polarized light into a vertically polarized light and converting a vertically polarized light into a horizontally polarized light, wherein intermediate portion of a plurality of the connecting waveguide being formed with S-shaped waveguides of the same shape consisted of respectively two curved waveguides.or two curved waveguides and straight waveguides connecting the curved waveguides, and one or two polarization mode converters being provided in a groove formed across the S-shaped waveguide, and a perpendicular line to an incident surface of light of the polarization mode converter and the S-shaped waveguide forms an angle greater than 0°.

According to a second aspect, the invention provides a no polarization dependent waveguide type optical circuit provided with a polarization mode converter for converting a horizontally polarized light into a vertically polarized light and a vertically polarized light into a horizontally polarized light at a center of an optical path of connecting waveguides of a Mach-Zehnder interferometer optical circuit including a first directional coupler and a second directional coupler, in which two optical waveguides formed on a substrate are placed close proximity with each other, and two connecting waveguides connecting the first directional coupler and the second directional coupler, wherein intermediate portion of the two connecting waveguide being formed with S-shaped waveguides of the same shape consisted of respectively two curved waveguides or two curved waveguides and straight waveguides connecting the curved waveguides, and one or two polarization mode converters being provided in a groove formed across the S-shaped waveguide, and a perpendicular line to an incident surface of light of the polarization mode converter and the S-shaped waveguide forms an angle greater than 0°.

According to a third aspect, the invention provides a no polarization dependent waveguide type optical circuit provided with a polarization mode converter for converting a horizontally polarized light into a vertically polarized light and a vertically polarized light into a horizontally polarized light at a center of an optical path of connecting waveguides of a Mach-Zehnder interferometer optical circuit including a first multi-mode interference coupler and a second multi-mode interference coupler, in which two optical waveguides formed on a substrate are placed close proximity with each other, and two connecting waveguides connecting the first multi-mode coupler and the second multi-mode coupler, wherein intermediate portion of the two connecting waveguide being formed with S-shaped waveguides of the same shape consisted of respectively two curved waveguides or two curved waveguides and straight waveguides connecting the curved waveguides, and one or two polarization mode converters being provided in a groove formed across the S-shaped waveguide, and a perpendicular line to an incident surface of light of the polarization mode converter and the S-shaped waveguide forms an angle greater than 0°.

According to a fourth aspect, the invention provides a no polarization dependent waveguide type optical circuit wherein, in the second or third aspect, a thermo-optic phase shifter is provided at least one of the connecting waveguides, and the thermo-optic phase shifter is separated on input side and output side of the polarization mode converter.

According to a fifth aspect, the invention provides a no polarization dependent waveguide type optical circuit including one or more input waveguides, a first slab waveguide, in which a light propagated through the input waveguide propagates freely, an arrayed waveguide consisted of a plurality of waveguides connected to the first slab waveguide and provided a given optical path length difference respective of adjacent waveguides, a second slab waveguide connected to the array waveguide and freely propagating the light propagated through the arrayed waveguide, and one of more output waveguide for forming an arrayed waveguide grating circuit, and a polarization mode converter converting a horizontally polarized light into a vertically polarized light and a vertically polarized light into a horizontally polarized light being provided in a center of an optical path of the arrayed waveguide of the arrayed waveguide grating circuit, wherein intermediate portion of the arrayed waveguide being formed with S-shaped waveguides of the same shape consisted of respectively two curved waveguides or two curved waveguides and straight waveguides connecting the curved waveguides, and one or two polarization mode converters being provided in a groove formed across the S-shaped waveguide, and a perpendicular line to an incident surface of light of the polarization mode converter and the S-shaped waveguide forms an angle greater than 0°.

According to a sixth aspect, the invention provides a no polarization dependent waveguide type optical circuit wherein, in any one of the first to fifth aspect, the angle defined between perpendicular line to an incident surface of light of the polarization mode converter and the S-shaped waveguide is in a range of 3 to 10°.

According to a seventh aspect, the invention provides a no polarization dependent waveguide type optical circuit wherein, in any one of the first to sixth aspect, the straight waveguide connecting the curved waveguides is tapered varying width in longitudinal direction, and the width of the tapered straight waveguide becomes maximum at a portion where the polarization mode converter is provided.

According to a eighth aspect, the invention provides a no polarization dependent waveguide type optical circuit wherein, in any one of the first to seventh aspect, the polarization mode converter is a half-wave plate, an optical main axis of the half-wave plate forms 45° relative to a waveguide substrate.

According to a ninth aspect, the invention provides a no polarization dependent waveguide type optical circuit wherein, in any one of the first to eighth aspect, the polarization mode converter is a thin film type half-wave plate.

According to a tenth aspect, the invention provides a no polarization dependent waveguide type optical circuit wherein, in any one of the first to ninth aspect, the optical waveguide is a glass optical waveguide.

The above and other objects, features and advantages of the present invention will become more apparent from the following description of embodiments thereof taken in conjunction with the accompanying drawings.

BRIEF DESCRIPTION OF THE DRAWINGS

FIGS. 9A and 9B are illustration showing the conventional Mach-Zehnder interferometer optical circuit, in which FIG. 9A is a plan view and FIG. 9B is a section;

DESCRIPTION OF THE PREFERRED EMBODIMENT

Embodiment 1

Figure 1:
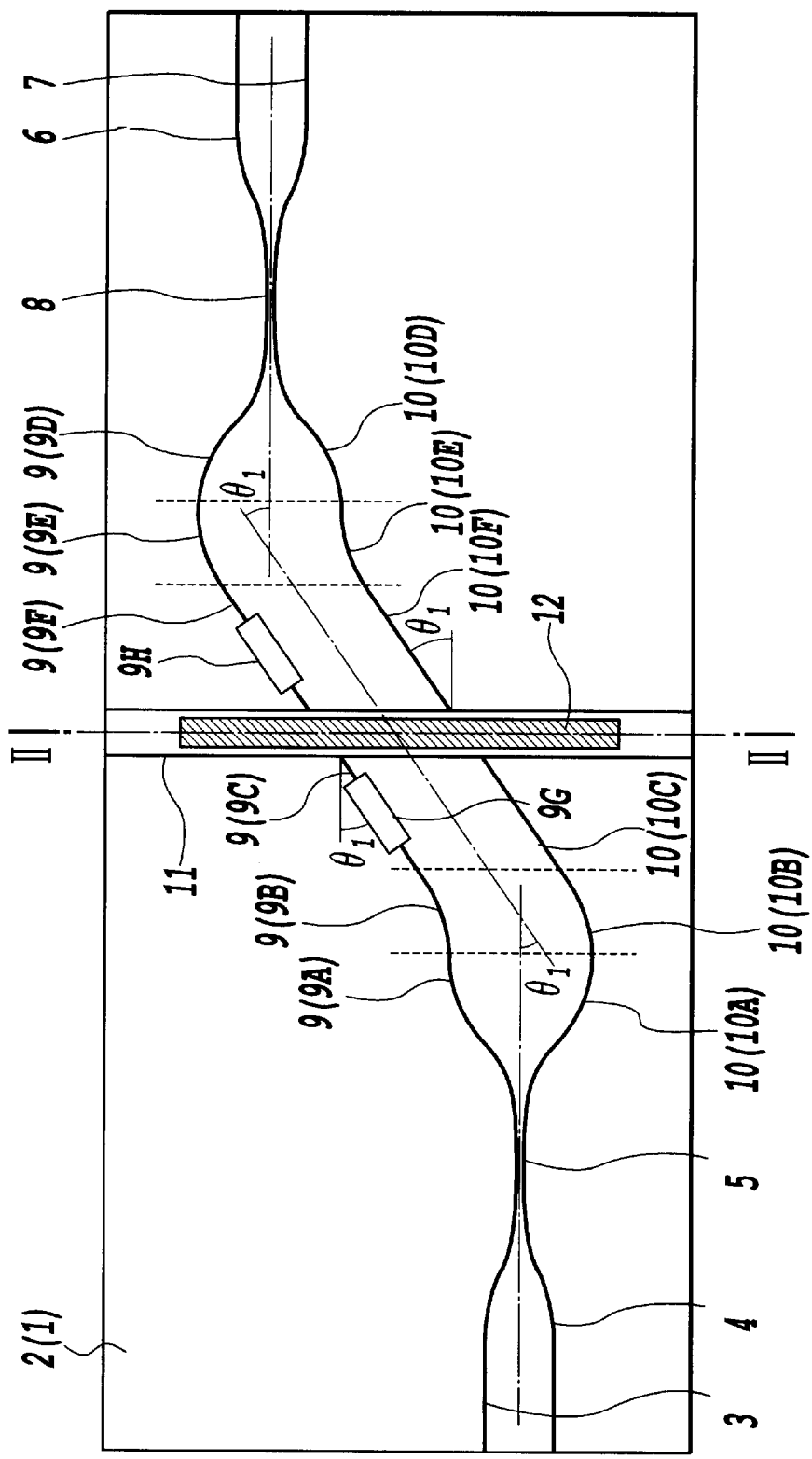
FIG. 1 is a plan view showing a general construction of an embodiment 1 of no polarization dependent waveguide type optical circuit according to the present invention.
Figure 2:
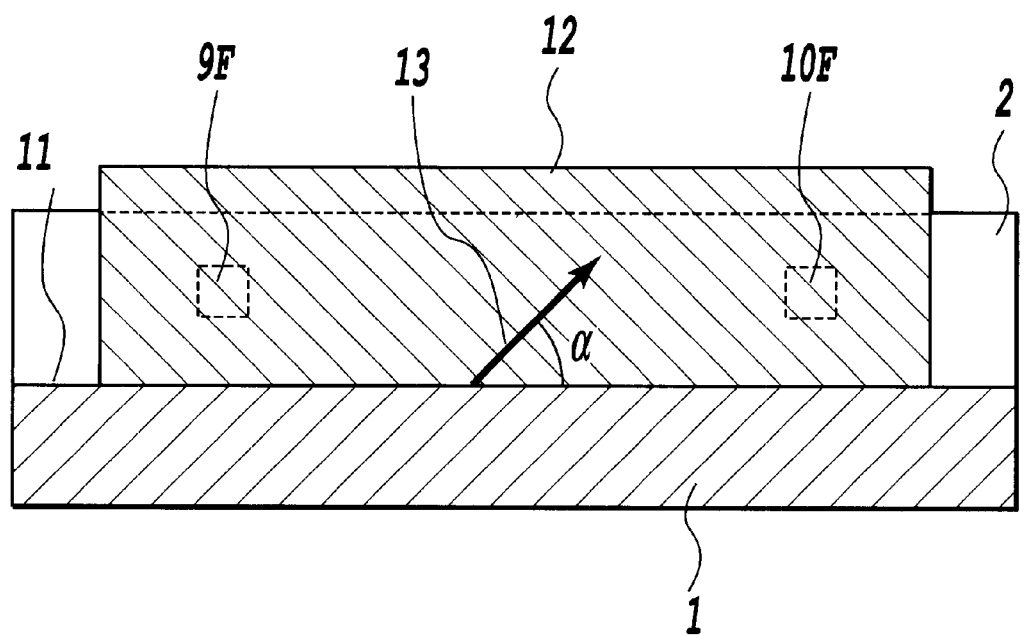
FIG. 2 is a section taken along line II—II of FIG. 1.

FIG. 1 is a plan view showing a general construction of an embodiment 1 of no polarization dependent waveguide type optical circuit according to the present invention, and FIG. 2 is a section taken along line II—II of FIG. 1.

In FIGS. 1 and 2, the reference numeral 1 denotes a silicon substrate, 2 denotes a clad, 3 denotes a first input waveguide, 4 denotes a second input waveguide, 5 denotes a first directional coupler acting as a first optical coupler, 6 denotes a first output waveguide, 7 denotes second output waveguide, 8 denotes second directional coupler acting as a second optical coupler, 9 denotes a first connection waveguide, 10 denotes a second connection waveguide, 11 denotes a half-wave plate insertion groove 11, 12 denotes a thin film type half-wave plate 12 serving as a polarization mode converter, 9A denotes a first developing waveguide, 9B denotes a first curved waveguide, 9C denotes a first straight waveguide, 9D denotes a second developing waveguide, 9E denotes a second curved waveguide, 9F denotes a second straight waveguide, 9G and 9H denote thermo-optic phase shifters (thin film heater), 10A denotes a third developing waveguide, 10B denotes a third curved waveguide, 10C denotes a third straight waveguide, 10D denotes a fourth developing waveguide, 10E denotes a fourth curved waveguide, 10F denotes a fourth straight waveguide, and, in FIG. 2, the reference numeral 13 denotes an optical main axis 13.

As shown in FIGS. 1 and 2, the no polarization dependent waveguide type optical circuit of the embodiment 1 is a Mach-Zehnder interferometer optical circuit which is constructed with first input waveguide 3 and second input waveguide 4 formed in the clad 2 on the silicon substrate 1, the first directional coupler 5 formed by placing the first input waveguide 3 and the second input waveguide 4 in proximal with each other, the first output waveguide 6 and the second output waveguide 7, the second directional coupler 8 formed by placing the first output waveguide 6 and the second output waveguide 7 in proximal with each other, the first connection waveguide 9 and the second connection waveguide 10 connecting the first directional coupler 5 and the second directional coupler 8, the thin film type half-wave plate 12 inserted in the half-wave plate insertion groove 11 extending through the first connection waveguide 9 and the second connection waveguide 10. As the first directional coupler 5 and the second directional coupler 8, 3 dB coupler is used.

The first connection waveguide 9 is constructed with first developing waveguide 9A connected to the first directional coupler 5, the first curved waveguide 9B connected to the first developing waveguide 9A, the first straight waveguide 9C positioned between the first curved waveguide 9B and the half-wave plate insertion groove 11, the second developing waveguide 9D connected to the second directional coupler 8, the second curved waveguide 9E connected to the second developing waveguide 9D and the second straight-.waveguide 9F positioned between the second curved waveguide 9E and the half-wave plate insertion groove 11.

Similarly, the second connection waveguide 10 is constructed with the third developing waveguide 10A connected to the first directional coupler 5, the third curved waveguide 10B connected to the third developing waveguide 10A, the third straight waveguide 10C positioned between the third curved waveguide 10B and the half-wave plate insertion groove 11, the fourth developing waveguide 10D connected to the second directional coupler 8, the fourth curved waveguide 10E connected to the fourth developing waveguide 10D and the fourth straight waveguide 10F positioned between the fourth curved waveguide 10E and the half-wave plate insertion groove 11.

It can be said that the Mach-Zehnder interferometer optical circuit of the shown embodiment 1 is divided by the half-wave plate insertion groove 11 into two parts, the first curved waveguide 9B and the third curved waveguide 10B having the same radius and the same angle $\Theta_1$, the second curved waveguide 9E and the fourth curved waveguide 10E having the same radius and the same angle $\Theta_1$ but oriented the rotational center offsetting from those of the first curved waveguide 9B and the third curved waveguide 10B over 180°, and these first straight waveguide 9C, the third straight waveguide 10C, the second straight waveguide 9F and the fourth straight waveguide 10F are connected.

An S-shaped waveguide formed with the first curved waveguide 9B, the first straight waveguide 9C, the second curved waveguide 9E and the second straight waveguide 9F at the intermediate portion of the first connection waveguide 9 and an S-shaped waveguide formed with the third curved waveguide 10B, the third straight waveguide 10C, the fourth curved waveguide 10E and the fourth straight waveguide 10F at the intermediate portion of the second connection waveguide 10 are the same shape and have the optical path length. Therefore, the optical path length difference $\Delta L$ between the first connection waveguide 9 and the second connection waveguide 10 is provided by a developing distance of the first developing waveguide 9A, the third developing waveguide 10A, the second developing waveguide 9D and the fourth developing waveguide 10D.

Each waveguide is a quartz type optical waveguide As a material for forming the optical waveguide, a fused silica prepared by way of flame hydrolysis deposition is used. As shown in FIG. 2, the section is that a core having a section of 7 $\mu$m×7 $\mu$m, for example the second straight waveguide 9F and the fourth straight waveguide 10F, is embedded at substantially center portion of a clad 2 of 50 $\mu$m thick deposited on the silicon substrate 1. A difference of refraction indexes of the clad and the core is 0.75%.

On the other hand, as shown in FIG. 1, the half-wave plate insertion groove 11 is formed in the optical paths of the first connection waveguide 9 and second connection waveguide 10 with its perpendicular lines forming the angle $\Theta_1$ with the first straight waveguide 9C, the second straight waveguide 9F, the third straight waveguide 10C and the fourth straight waveguide 10F. The half-wave plate insertion groove 11 has a dimension of about 30 $\mu$m in width and about 100 $\mu$m in depth. The half-wave plate insertion groove 11 is prepared by reactive ion etching or machining, such as dicing saw. The thin half-wave plate 12 inserted into the half-wave plate receptacle groove 11 has in-plain double refraction with high refraction index in drawing direction The thin film type half-wave plate 12 inserted within the half-wave plate insertion groove 11 is a film having a thickness about 20 $\mu$m formed by unidirectional drawing of polyimide film. The optical main axis 13 is oriented to have angle of 45° with the silicon substrate 1 as shown in FIG. 2.

The thin film type half-wave plate 12 inserted within the half-wave plate insertion groove 11 is fixed by an ultraviolet curing or thermosetting optical bond. The thin film type half-wave plate 12 is divided into two by the first directional coupler 5. Then, the TE mode light and TM mode light having wavelength of 1.55 $\mu$m propagated through the first developing waveguide 9A, the first curved waveguide 9B and first straight waveguide 9C of the first connection waveguide 9 and the third developing waveguide 10A, the third curved waveguide 10B and the third straight waveguide 10C of the second connection waveguide 10 are respectively converted into TM mode light and the TE mode light to rotate the polarization surface over 90°. The thin film type half-wave plate 12 is arranged at the center of respective optical paths of the first connection waveguide 9 and the second connection waveguide 10 to have the same optical path length in either mode light. Therefore, polarization dependency of the Mach-Zehnder interferometer optical circuit can be resolved.

Respective refraction indexes of the thin film type half wavelength plate 12 and the optical bond fixing the thin film type half-wave plate 12 are generally different. Therefore, the light propagated through the connecting waveguide is reflected on respective boundary surface.

Figure 3:
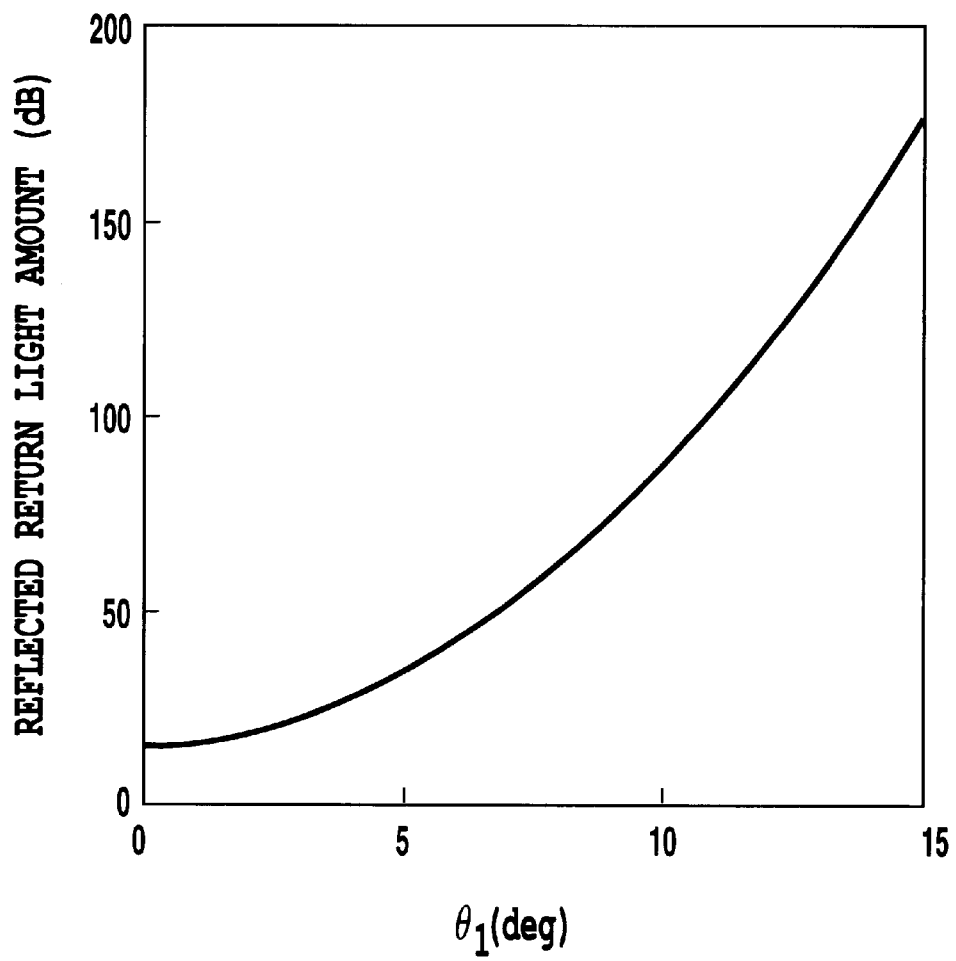
FIG. 3 is an illustration for explaining operation of the embodiment 1 of no polarization dependent waveguide type optical circuit.

FIG. 3 is an illustration for explaining operation of the no polarization dependent waveguide type optical circuit of the shown embodiment 1 and shows a result of calculation of the reflected return light amount depending upon the angle $\Theta_1$ formed by the perpendicular line to the incident surface of the half-wave plate and the waveguide.

The result of calculation shown in FIG. 3 shows the result obtained assuming the dimension of the core section of the waveguide is 7 $\mu$m×7 $\mu$m, and relative refraction index difference of the clad and the core is 0.75%, and the substance filled in the half-wave plate insertion groove 11 is air (refraction index is 1.0). Normally, at the boundary with the waveguide, bond is filled. Since the bond having refraction index close to the refraction index of the waveguide is used, the reflected return light amount becomes the maximum, and the value to be actually returned is smaller.

Figure 4:
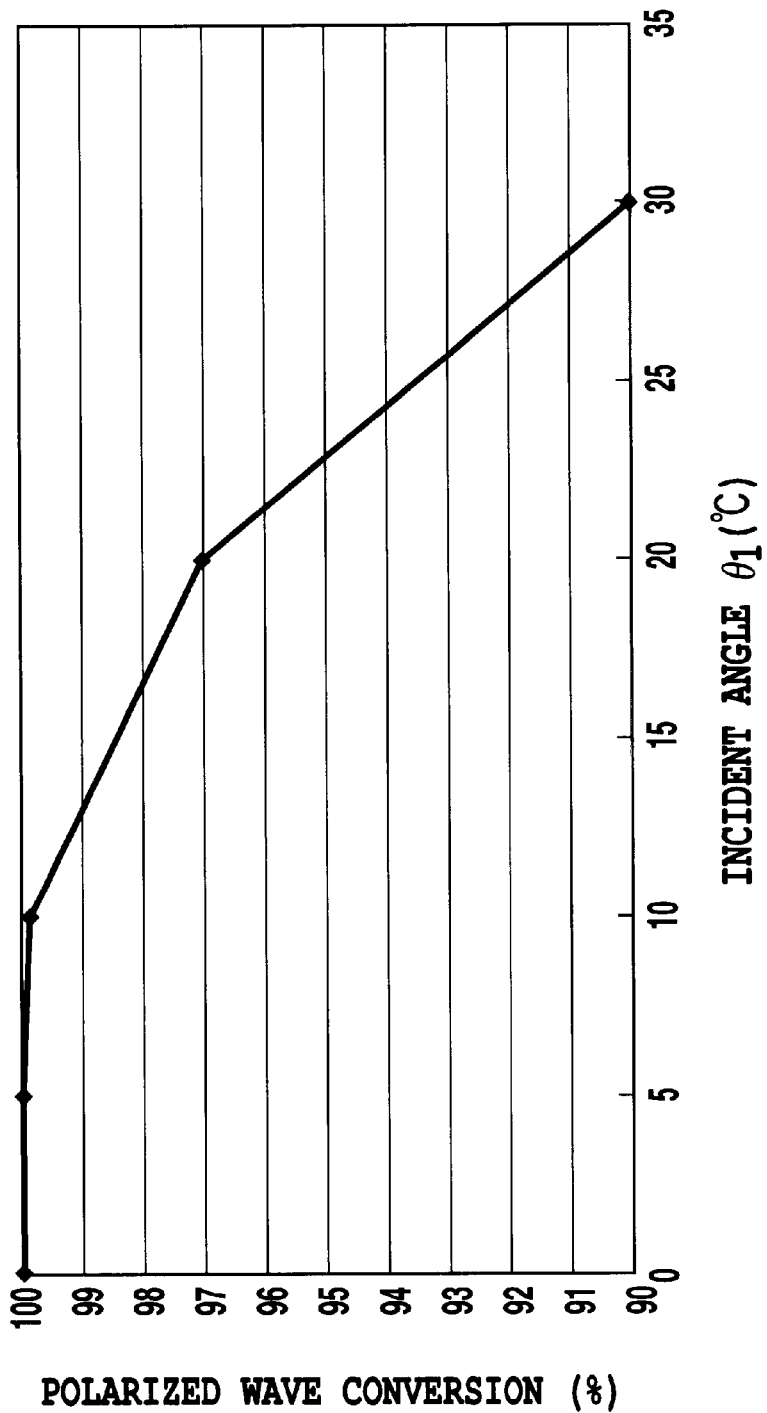
FIG. 4 is an illustration showing an incident angle Θ1 dependency of polarized wave conversion efficiency by a thin film half-wave plate.

When the angle $\Theta_1$ between the thin film type half-wave plate 12 and the straight waveguide portion of each connection waveguide is 0°, there is 14.7 dB of reflected return light. The reflected return light among becomes smaller at greater angle $\Theta_1$. For example, when the $\Theta_1$ is greater than or equal to 5°, the reflected return light amount becomes greater than or equal to 30 dB, and when $\Theta_1$ is greater than or equal to 8°, the reflected return light amount becomes greater than or equal to 60 dB, Accordingly, in only viewpoint of lowering of the reflected return light, it is preferred to make the angle $\Theta_1$, as great as possible. However, if the angle $\Theta_1$ becomes excessively great, the polarization conversion efficiency of the thin film type half-wave plate 12 is degraded. The relationship between $\Theta_1$ and polarization conversion efficiency is shown in FIG. 4. As can be seen from FIG. 4, when the angle $\Theta_1$ is greater than or equal to 10° m the polarization conversion efficiency becomes less than or equal to 99.9% to abruptly degrade no polarization dependent efficiency. Therefore, the preferred range of the angle $\Theta_1$ is 3 to 10°. On the other hand, with taking the shown construction, the half-wave plate insertion groove 11 becomes single to facilitate machining by dicing saw or the like. Such machining is simpler in comparison with the formation method by etching or the like to enable formation of the groove in short period. Therefore, the shown method is advantageous in view point of manufacturing.

The shown embodiment is designed at $\Theta_1=5°$. At this time, the reflected return light to the incident port was −39 dB. Comparing the conventional case where the reflected return light was −22 dB at $\Theta_1=0°$, the reflected return light could be lowered about 17 dB.

Embodiment 1A

Figure 5:
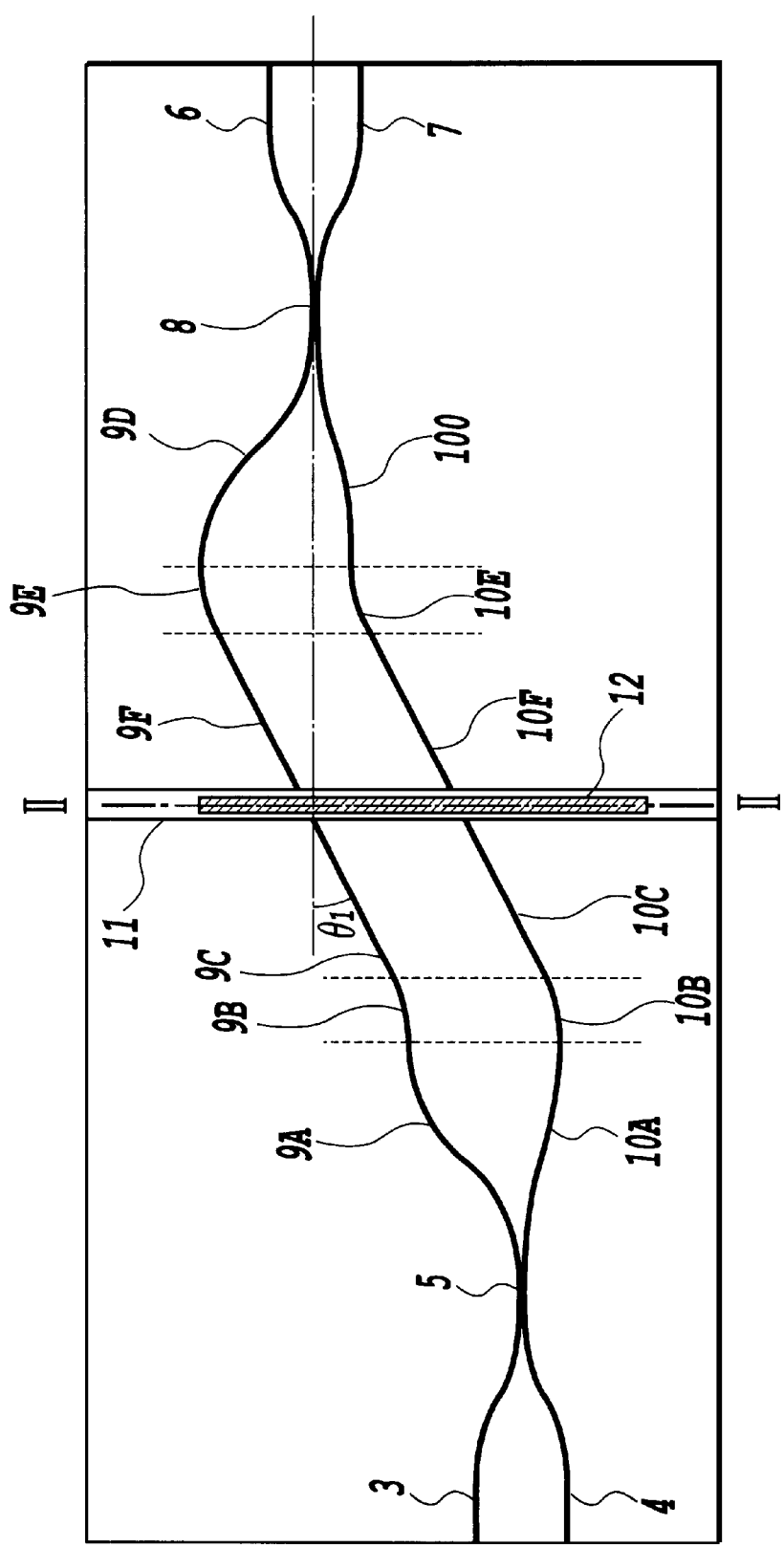
FIG. 5 is a plan view showing a general construction of an embodiment 1A of the no polarization dependent waveguide type optical circuit according to the present invention.

FIG. 5 is a plan view showing general construction of the no polarization dependent waveguide type optical circuit of the embodiment 1A according to the present invention. The shown embodiment is directed to no polarization dependent asymmetric Mach-Zehnder interferometer optical circuit as a wavelength filter having optical path length difference ΔL of two connecting waveguides of several μm. Lowering of reflection by the thin film half-wave plate is realized by providing the first curved waveguide 9B, first straight waveguide 9C, the second straight waveguide 9F and second curved waveguide 9E at the central portion of the first connection waveguide 9 and by providing the third curved waveguide 10B, the third straight waveguide 10C, the fourth straight waveguide 10F and the fourth curved waveguide 10E at the center portion of the second connection waveguide 10. Since total length of the first curved waveguide 9B, the first straight waveguide 9C, the second straight waveguide 9F and the second curved waveguide 9E and the total length of the third curved waveguide 10B, the third straight waveguide 10C, the fourth straight waveguide 10F and fourth curved waveguide 10E are equal to each other the optical path length difference ΔL is provided by the first developing waveguide 9A, the third developing waveguide 10A and the second developing waveguide 9D, fourth developing waveguide 10D.

Figure 6:
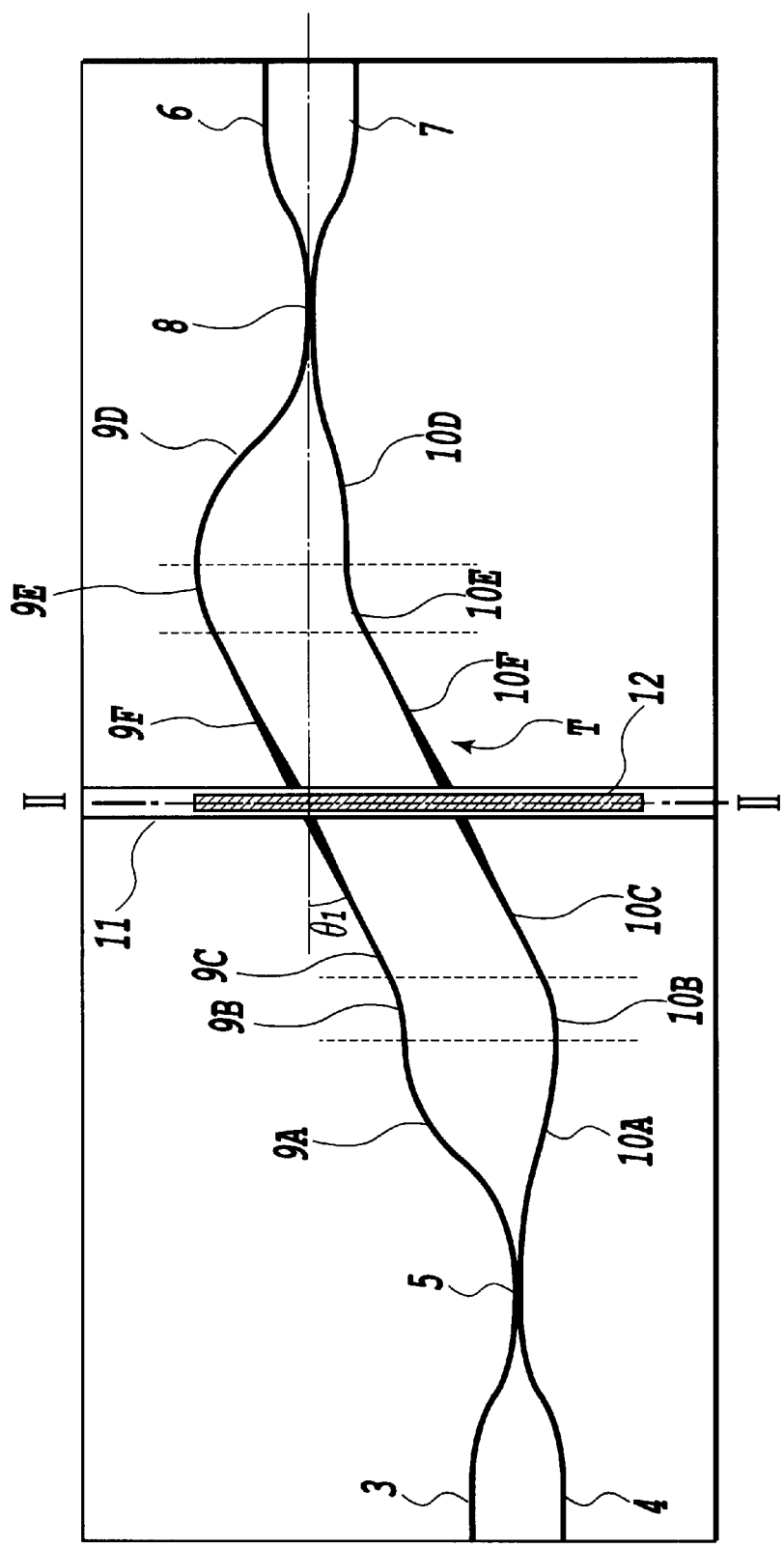
FIG. 6 is a plan view showing a general construction of an embodiment 1A of the no polarization dependent waveguide type optical circuit employing a tapered waveguide.

Furthermore, by forming the first straight waveguide 9C, the third straight waveguide 10C, the second straight waveguide 9F and the fourth straight waveguide 10F in tapered shape as shown in FIG. 6, field of waveguide mode as inciding to the thin film type half-wave plate 12 can be widen to result in lowering of efficiency of re-coupling of the reflection light generated by the thin film type half-wave plate 12 to the waveguide. Namely, by employing the tapered waveguide, the reflection light can be reduced. Also, such tapered waveguide is also effective in lowering the excess loss by the half-wave plate insertion groove 11. In the shown embodiment, by widening the core width from 7 μm to the widest 12 μm, the reflected return light can be lowered to −41 dB. In comparison with the case where the core width is not varied, about 2 dB of reflection suppressing effect could be realized.

As set forth above, the embodiment 1, in the Mach-Zehnder interferometer optical circuit, by providing the S-shaped waveguide consisted of the two curved waveguides and straight waveguides connecting the curved waveguide at the intermediate portion of the connecting waveguides connecting the first directional coupler and the second directional coupler, and the half-wave plate is inserted in the S-shaped waveguide portion, the polarization dependency can resolved. Thus, the no polarization dependent Mach-Zehnder interferometer optical circuit with lowered reflected return light can be obtained. In the foregoing embodiment, while directional couplers 5 and 8 are employed as optical couplers forming the Mach-Zehnder interferometer optical circuit, multi-mode interference coupler may also be employed in place.

Embodiment 2

Figure 7:
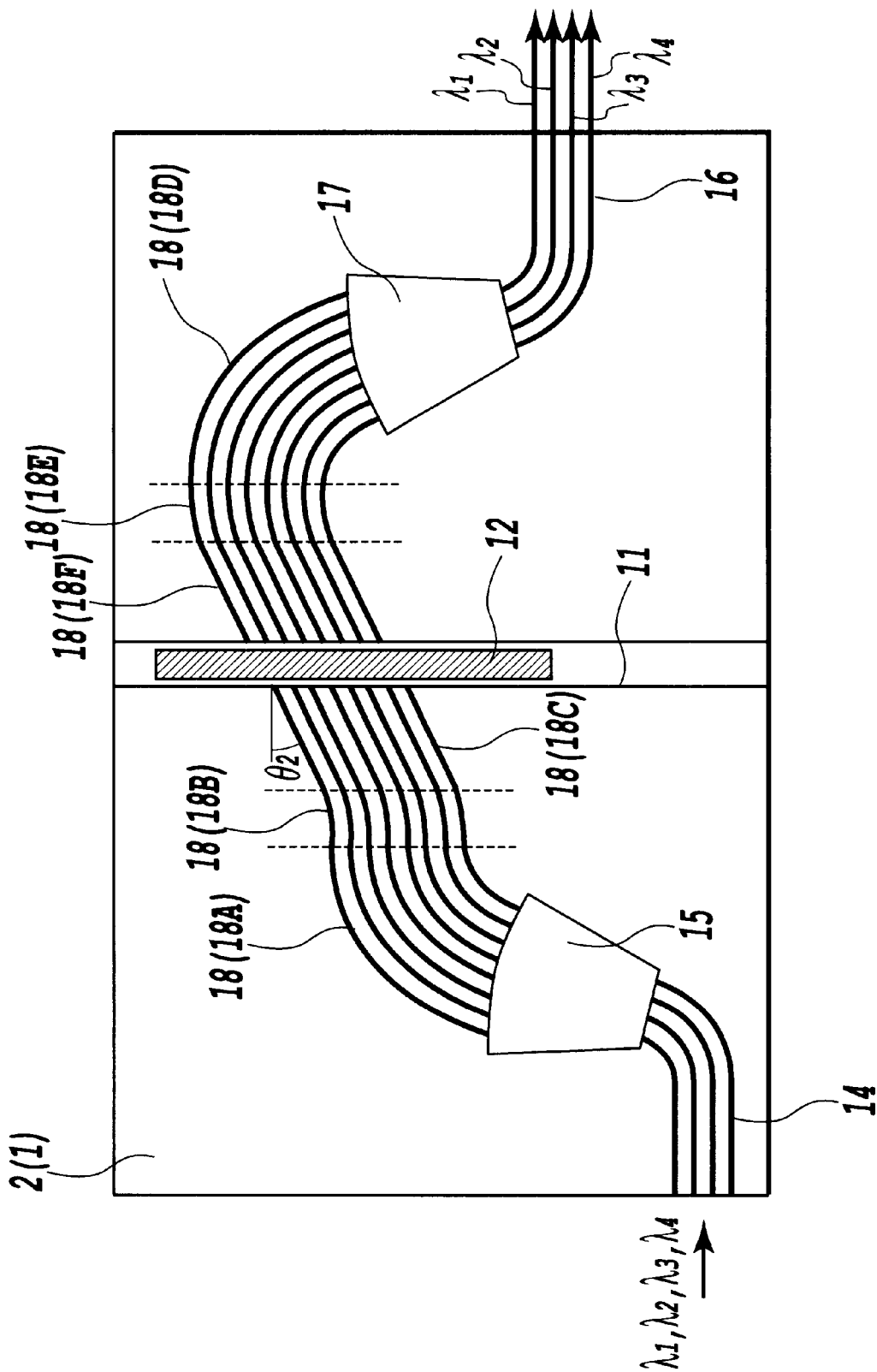
FIG. 7 is a plan view showing a general construction of an embodiment 2 of no polarization dependent waveguide type optical circuit according to the present invention.

FIG. 7 is plan view showing a general construction of the no polarization dependent waveguide type optical circuit of the embodiment 2 according to the present invention. The reference numeral 14 denotes an input waveguide cluster, 15 denotes a first slab waveguide, 16 denotes an output waveguide cluster, 17 denotes a second slab waveguide, 18 denotes an arrayed waveguide, 18A denotes a first arrayed waveguide, 18B denotes a second curved waveguide cluster, 18C denotes a first straight waveguide cluster, 18D denotes a second waveguide, 18E denotes a second curved waveguide cluster, 18F denotes a second straight waveguide cluster.

As shown in FIG. 7, the no polarization dependent waveguide type optical circuit of the second embodiment of the present invention is constructed with the input waveguide cluster 14 and the first slab waveguide 15 connected to the input waveguide cluster 14, the output waveguide cluster 16, the second slab waveguide 17 connected to the output waveguide cluster 16, the array waveguide 18 connecting the first slab waveguide 15 and the second slab waveguide 17, and the thin film type half-wave plate 12 inserted in the half-wave plate insertion groove 11 extending through the arrayed waveguide 18.

The array waveguide 18 is constructed with the first arrayed waveguide 18A connected to the first slab waveguide 15, the first curved waveguide cluster 18B connected to the first array waveguide 18A, the first straight waveguide 18C positioned between the first curved waveguide flux 18B and the half-wave plate insertion groove 11, the second arrayed waveguide 18D connected to the second slab waveguide 17, the second curved waveguide cluster 18E connected to the second arrayed waveguide 18D, the second straight waveguide cluster 18F positioned between the second curved waveguide cluster 18E and the half-wave plate insertion groove 11.

Respective connection points between the first arrayed waveguide 18A and the first curved waveguide cluster 18B and between the first curved waveguide cluster 18B and the first straight waveguide cluster 18C, and respective connection points between the second arrayed waveguide 18D and the second curved waveguide cluster 18E and between the second curved waveguide cluster 18E and the second straight waveguide cluster 18F are located in alignment on a line parallel to the half-wave plate insertion groove 11 and the thin film type half-wave plate 12. On the other hand, the half-wave plate insertion groove 11 is formed by etching or machining such as dicing saw or the like.

The arrayed waveguide grating optical circuit of the shown embodiment 2 has a construction for reducing the reflected return light from the thin film type half-wave plate 12 in the same method as the Mach-Zehnder interferometer optical circuit of the embodiment 1. Namely, by separating the arrayed waveguide grating optical circuit shown in FIG. 9 by the half-wave plate insertion groove 11, and the separated components are connected by the S-shaped waveguide consisted of the first curved waveguide cluster 18B, the second curved waveguide cluster 18E and the first straight waveguide 18C and the second straight waveguide 18F.

Figure 14:
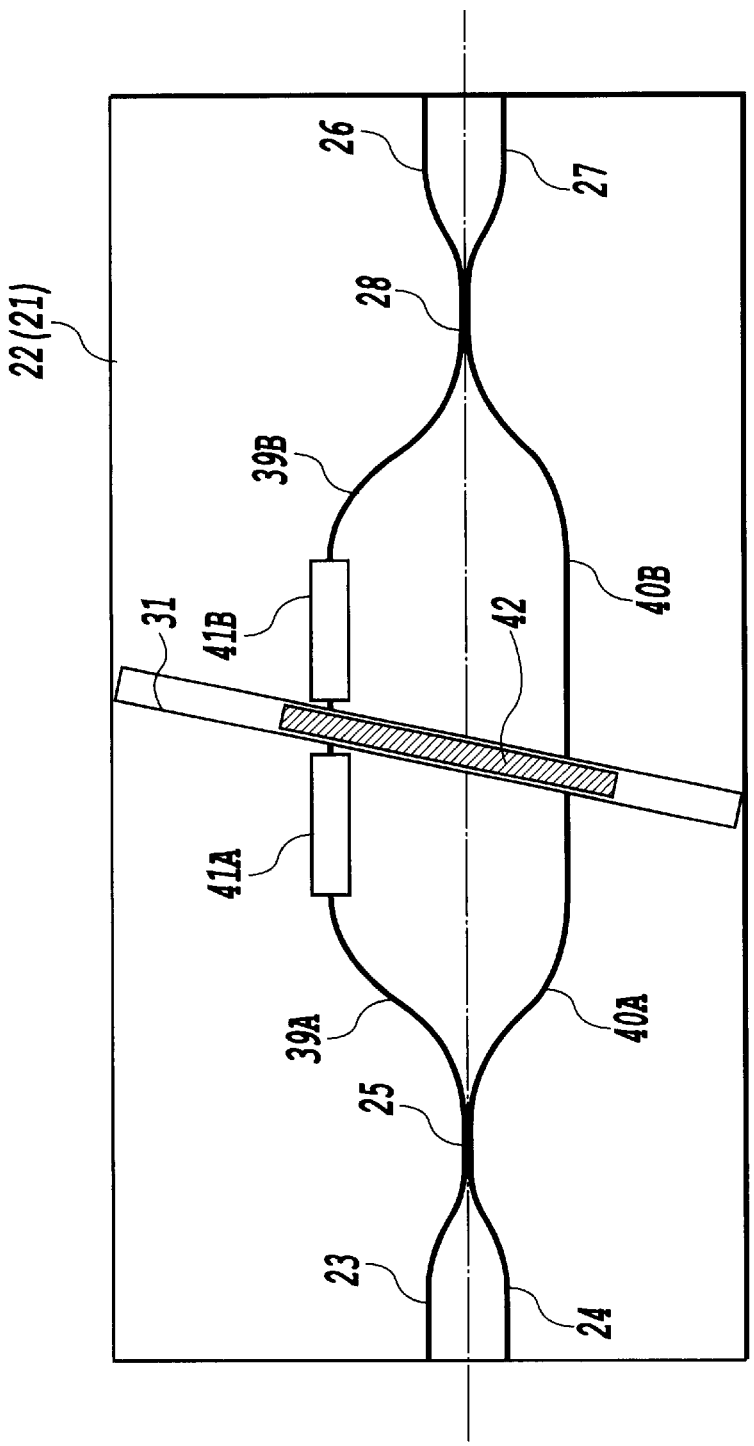
FIG. 14 is a plan view of the Mach-Zehnder interferometer optical circuit restricting a reflected return light.
Figure 15:
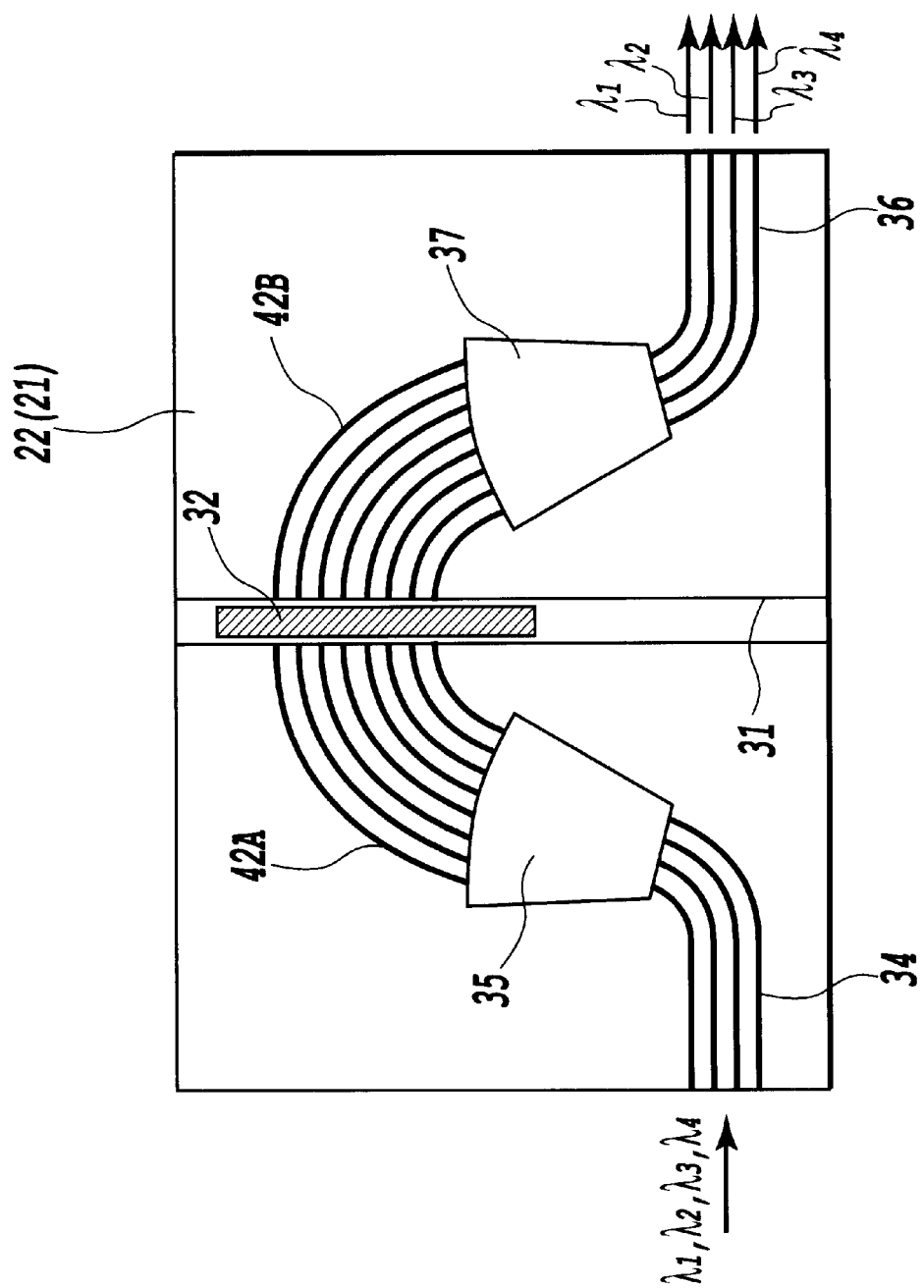
FIG. 15 is a plan view of the conventional no polarization dependent type arrayed waveguide grating optical circuit.
Figure 16:
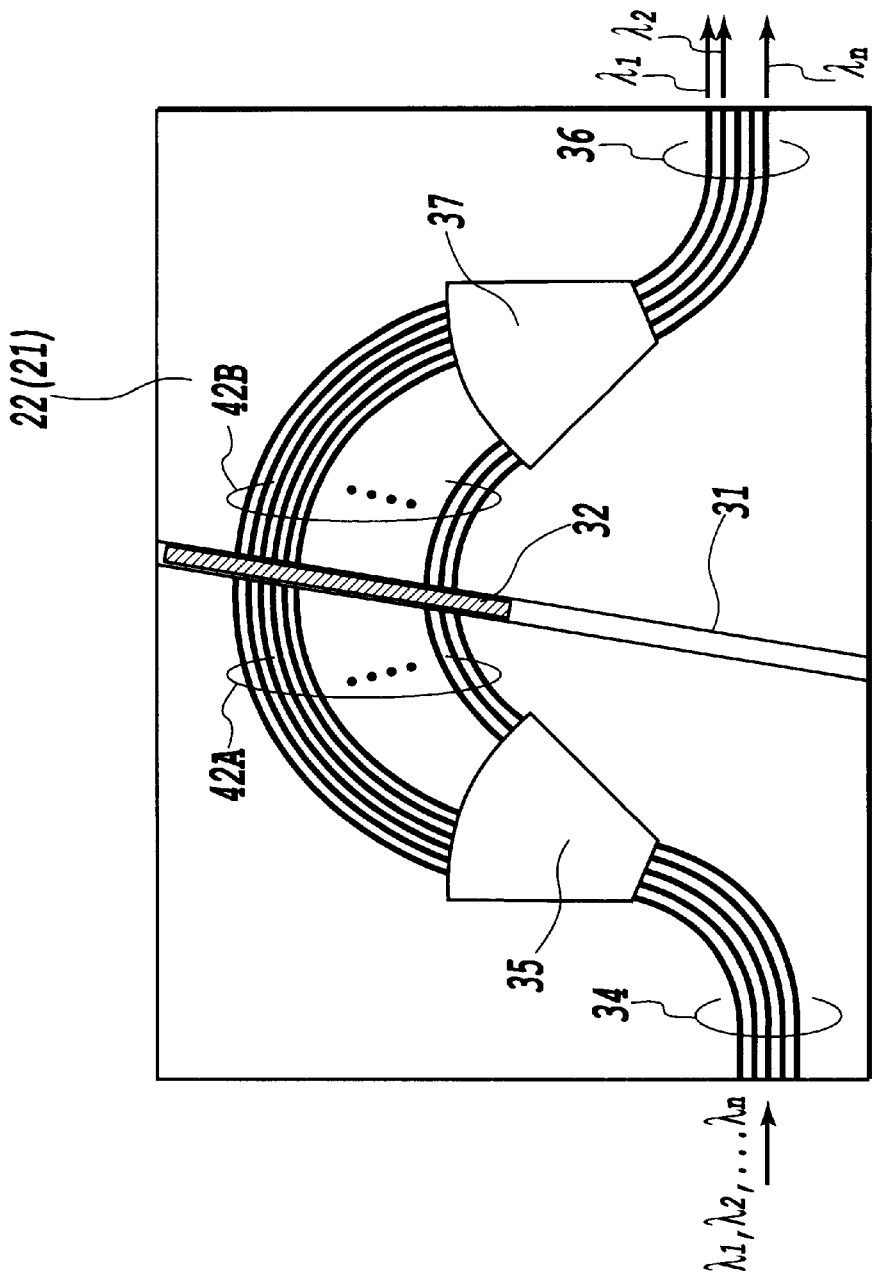
FIG. 16 is a plan view of the arrayed waveguide grating optical circuit restricted the reflected return light.
Figure 17:
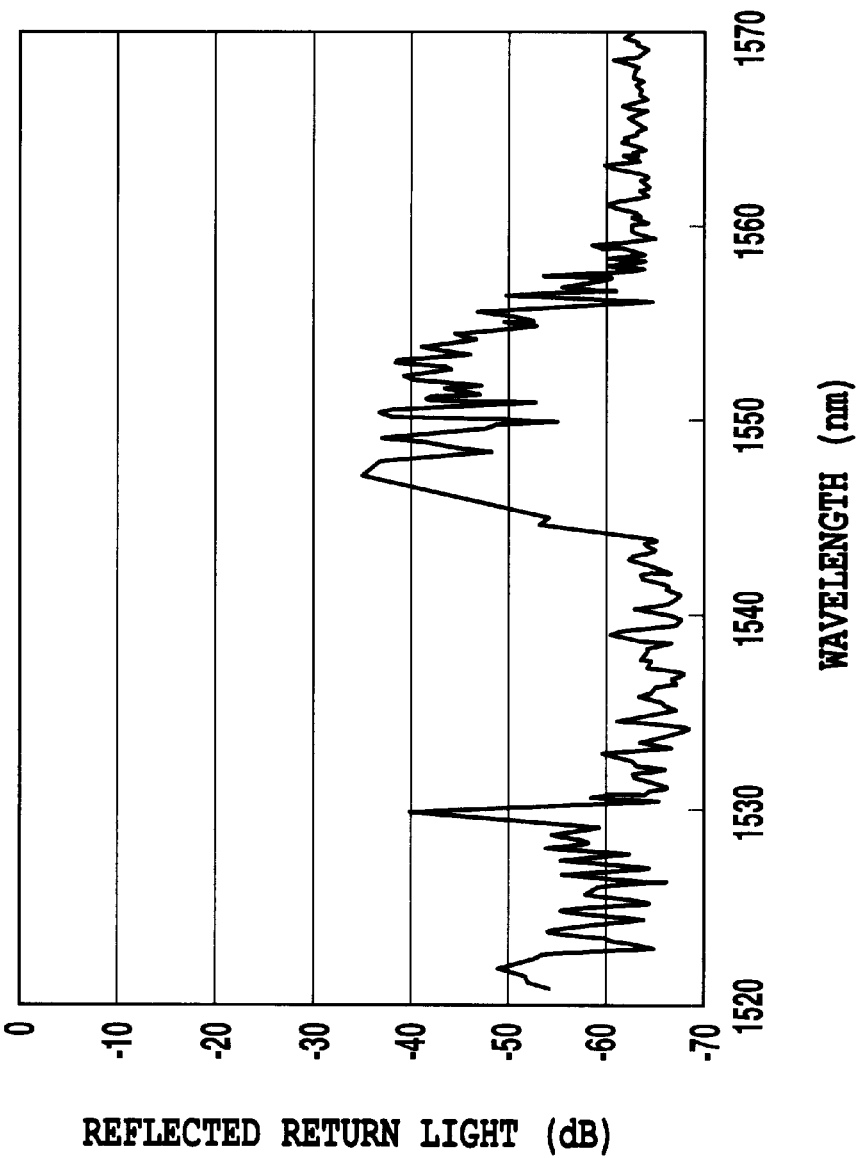
FIG. 17 is an illustration showing a reflection spectrum of the conventional arrayed waveguide grating optical circuit.

The curved waveguides forming the first curved waveguide cluster 18B and the second curved waveguide cluster 18E have the same curve radius and angle $\Theta_2$, and the curve of the first curved waveguide cluster 18B and the curve of the second curved waveguide cluster 18E are differentiated the orientation of rotational center over 180°. On the other hand, straight waveguides forming the first straight waveguide cluster 18C and the second straight waveguide cluster 18F have the same length, and their perpendicular lines form the same angle $\Theta_2$ with the half-wave plate insertion groove 11 and thin film type half-wave plate 12. Namely, each waveguide disposed between the first arrayed waveguide 18A and the second arrayed waveguide 18D are all have the same S-shaped configuration and have the same optical path lengths. Accordingly, each waveguide of the arrayed waveguide 18 disposed between the first slab waveguide 15 and the second slab waveguide 17 have the optical path length difference $\Delta L$ with adjacent waveguide to have the same characteristics as the arrayed waveguide grating optical circuit shown in FIG. 14.

Figure 8:
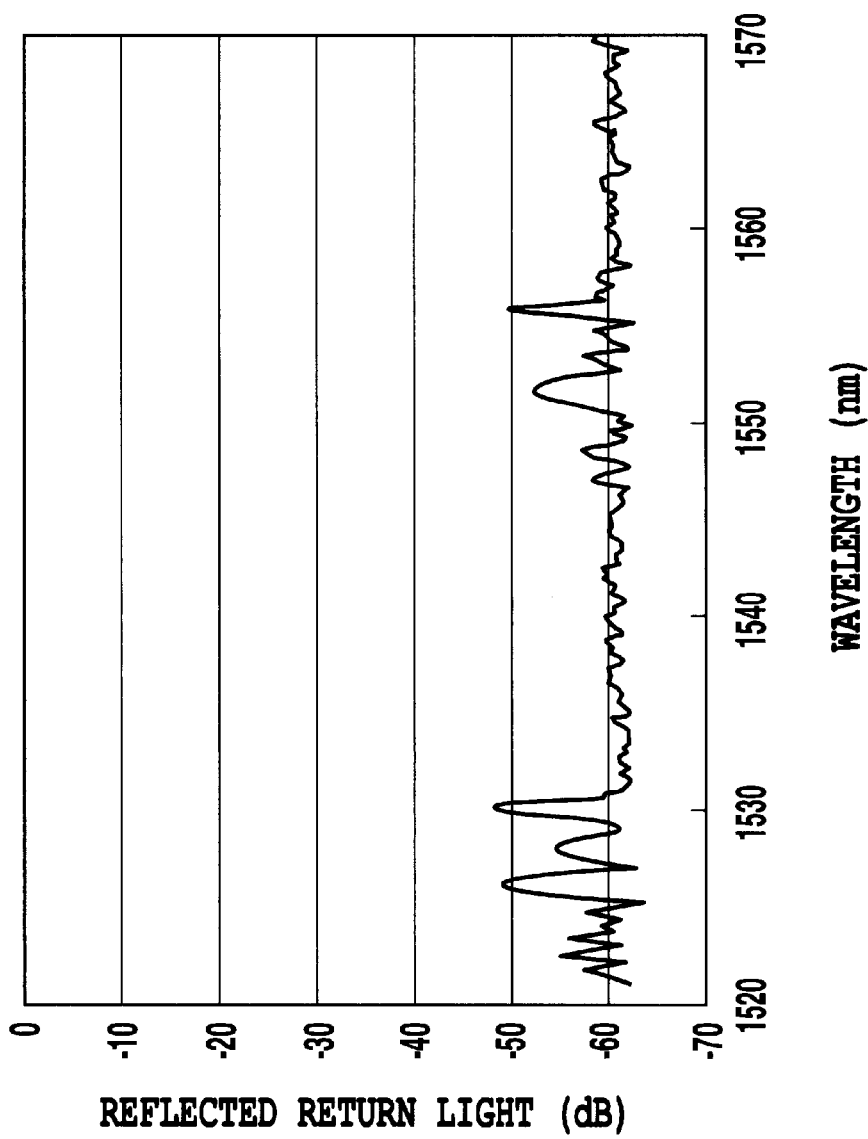
FIG. 8 is an illustration showing a reflection spectrum in the embodiment 2.
Figure 10:
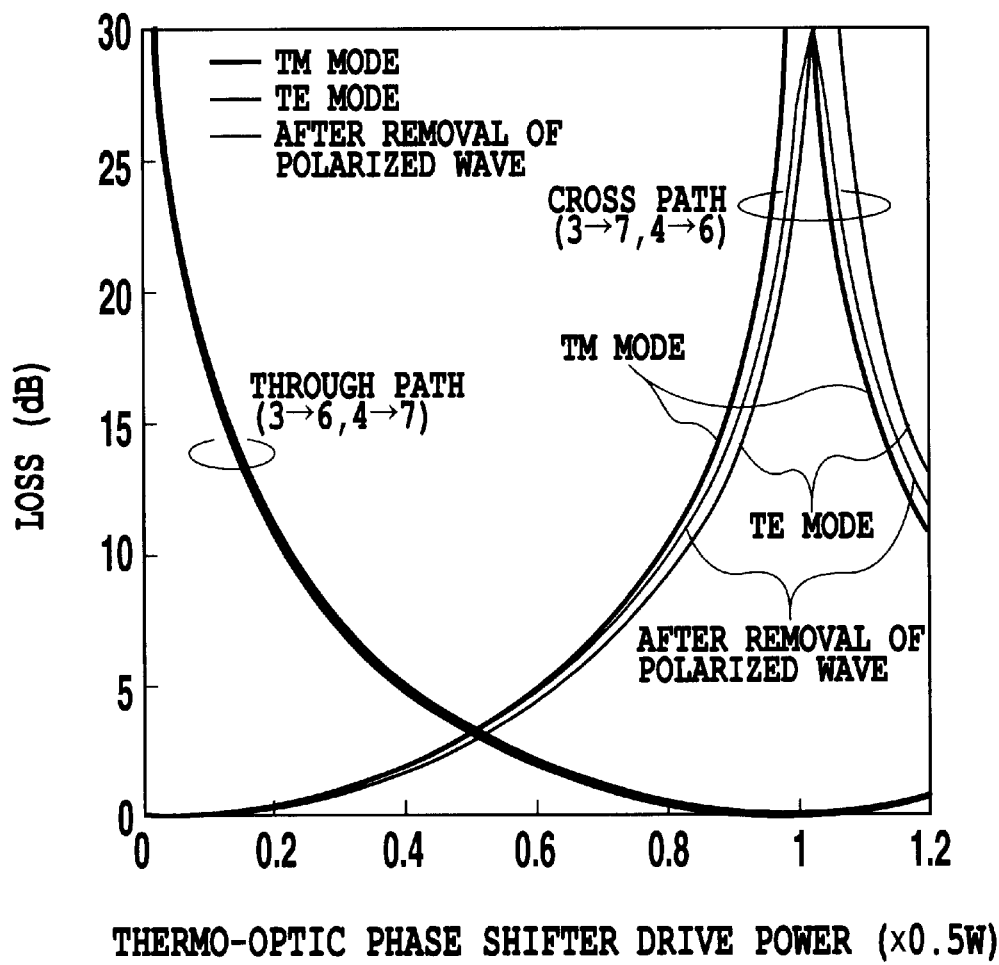
FIG. 10 is an illustration for explaining characteristics of the conventional Mach-Zehnder interferometer optical circuit.
Figure 11:
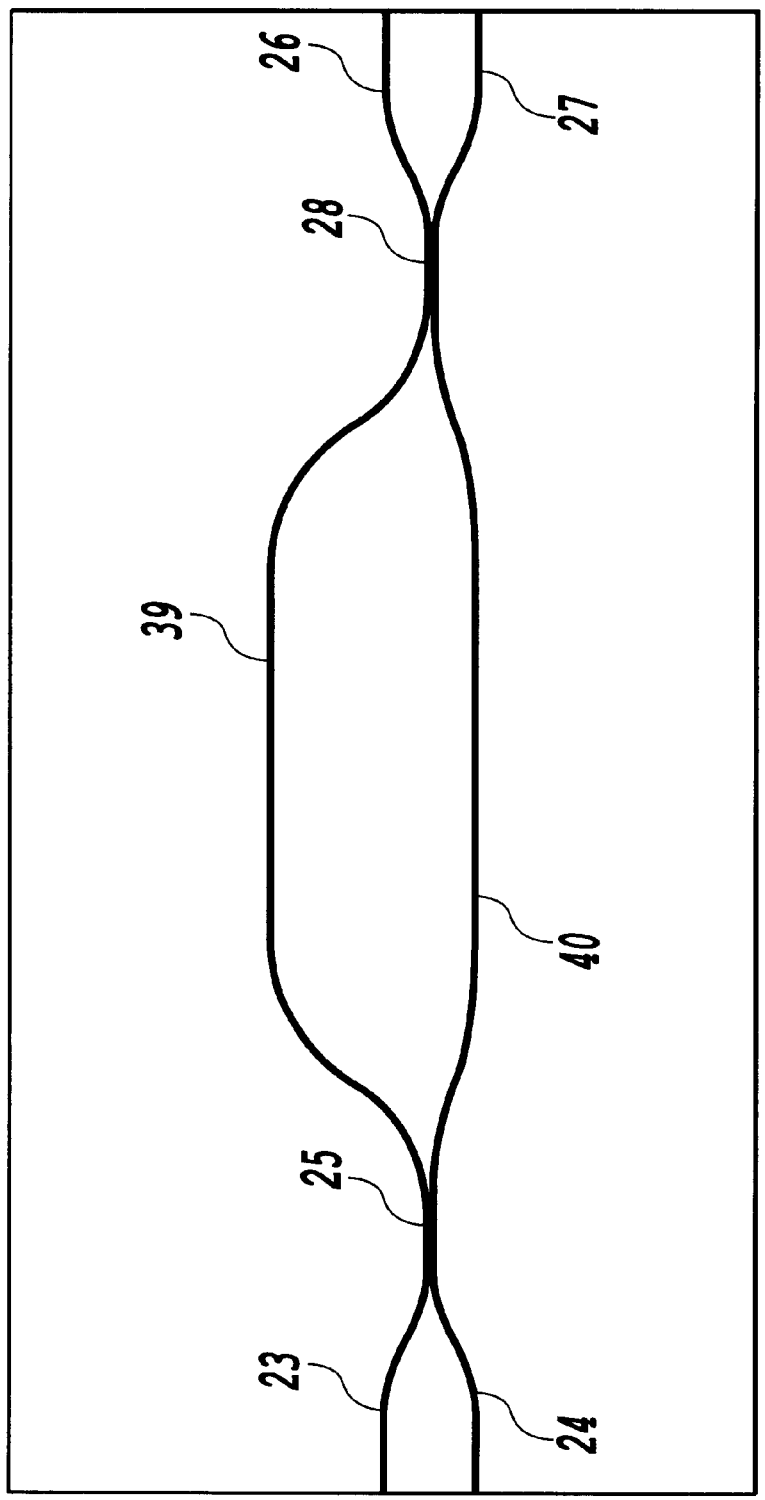
FIG. 11 is a plan view of asymmetric Mach-Zehnder interferometer optical circuit.
Figure 12:
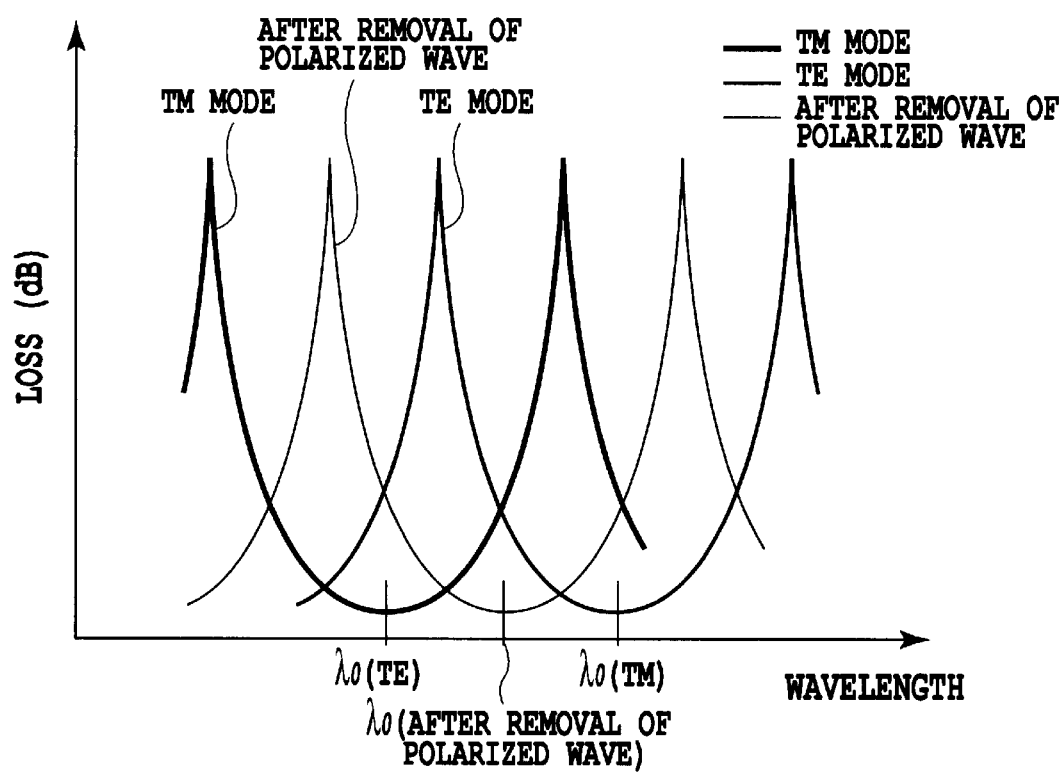
FIG. 12 is an illustration for explaining characteristics of the conventional Mach-Zehnder interferometer optical circuit.
Figure 13:
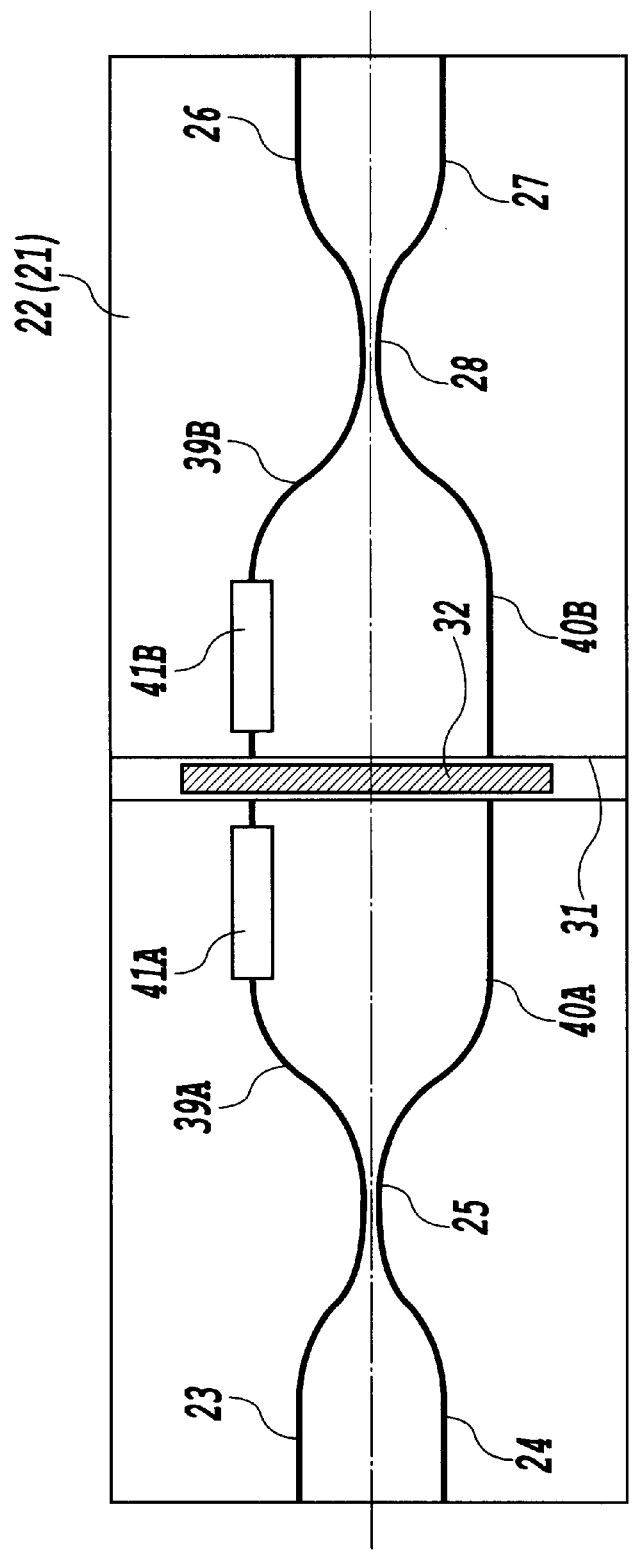
FIG. 13 is a plan view of the conventional no polarization dependent type Mach-Zehnder interferometer optical circuit.

The angle $\Theta_2$ between the perpendicular line of the thin film type half-wave plate 12 and each straight waveguide forming the first straight waveguide cluster and the second straight waveguide cluster 18F is preferred to be in a range of 3 to 10° as in the embodiment 1. The shown embodiment is defined to have the angle $\Theta_2=5°$. In this case, reflection spectrum of the arrayed waveguide grating optical circuit is shown in FIG. 8. The reflection is −50 dB at the maximum. In comparison with −35 dB of the prior art, 15 dB of reflection suppression could be realized. With taking the shown construction, the half-wave plate insertion groove 11 becomes single to facilitate machining by dicing saw or the like. Such machining is simpler in comparison with the formation method by etching or the like to enable formation of the groove in short period. Therefore, the shown method is advantageous in view point of manufacturing.

As set forth above, with the shown embodiment 2, in the arrayed waveguide grating optical circuit, it becomes possible to obtain the no polarization dependent waveguide type optical circuit, in which the S-shaped waveguides of the same shape consisted of two curved waveguides and straight waveguides connecting the curved waveguides are provided at the intermediate portion of the arrayed waveguide between the first slab waveguide and the second slab waveguide, and the half-wave plates are inserted in the S-shaped waveguide portion to resolve polarization dependency and to reduce reflected return light.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims. For instance, while the half-wave plate insertion groove 11 is formed across the straight waveguide in the S-shaped wave guide in the embodiment 1 and the embodiment 2, the S-shaped waveguide may also be formed only with the curved waveguides omitting the straight waveguides and the half-wave plate insertion groove 11 may be provided at the joint portion between the directly connected curved waveguides. Also, in the shown embodiments, while the thin film type half-wave plate 12 is inserted at physical center point of the optical circuit since the shown embodiment of the optical circuit has a symmetrical structure with respect to the direction for propagating the light. However, as shown in FIG. 7, the thin film type half-wave plate 12 may not cause optical characteristics even if it is moved in parallel in lateral direction as long as the region in the S-shaped waveguide 18. Therefore, it is not essential feature of the present invention to place the half-wave plate insertion groove 11 and the thin film type half-wave plate 12 at physical center point in the optical circuit.

The present invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A no polarization dependent waveguide type optical circuit including at least two input waveguides formed on a substrate, a first directional coupler connected to said input waveguides, at least two output waveguides, a second directional coupler connected to said output waveguides, two connecting waveguides connecting said first directional coupler and said second directional coupler forming an optical circuit, and a polarization mode converter provided at a center of an optical path of said connecting waveguides of said optical circuit and converting a horizontally polarized light into a vertically polarized light and converting a vertically polarized light into a horizontally polarized light, wherein intermediate portion of said connecting waveguides being formed with S-shaped waveguides of the same shape consisted of respectively two curved waveguides or two curved waveguides and straight waveguides connecting said curved waveguides, and a polarization mode converter being provided in a groove formed across said S-shaped waveguides, and a perpendicular line to an incident surface of light of said polarization mode converter and said S-shaped waveguide forms an angle,greater than 0°.

2. A no polarization dependent waveguide type optical circuit as claimed in claim 1, wherein said polarization mode converter is a half-wave plate, an optical main axis of said half-wave plate forms 45° relative to a waveguide substrate.

3. A no polarization dependent waveguide type optical circuit as claimed in claim 2, wherein the angle defined between perpendicular line to an incident surface of light of said polarization mode converter and said S-shaped waveguide is in a range of 3 to 10°.

4. A no polarization dependent waveguide type optical circuit as claimed in claim 3, wherein a thermo-optic phase shifter is provided at least one of said connecting waveguides, and said thermo-optic phase shifter is separated on input side and output side of said polarization mode converter.

5. A no polarization dependent waveguide type optical circuit as claimed in claim 4, wherein said straight waveguide connecting said curved waveguides is tapered varying width in longitudinal direction, and the width of the tapered straight waveguide becomes maximum at a portion where said polarization mode converter is provided.

6. A no polarization dependent waveguide type optical circuit as claimed in claim 3, wherein said straight waveguide connecting said curved waveguides is tapered varying width in longitudinal direction, and the width of the tapered straight waveguide becomes maximum at a portion where said polarization mode converter is provided.

7. A no polarization dependent waveguide type optical circuit including at least two input waveguides formed on a substrate, a first multi-mode interference coupler connected to said input waveguides, at least two output waveguides, a second multi-mode interference coupler connected to said output waveguides, two connecting waveguides connecting said first multi-mode interference coupler and said second multi-mode interference coupler forming an optical circuit, and a polarization mode converter provided at a center of an optical path of said connecting waveguides of said optical circuit and converting a horizontally polarized light into a vertically polarized light and converting a vertically polarized light into a horizontally polarized light, wherein intermediate portion of said connecting waveguides being formed with S-shaped waveguides of the same shape consisted of respectively two curved waveguides or two curved waveguides and straight waveguides connecting said curved waveguides, and a polarization mode converter being provided in a groove formed across said S-shaped waveguides, and a perpendicular line to an incident surface of light of said polarization mode converter and said S-shaped waveguide forms an angle greater than 0°.

8. A no polarization dependent waveguide type optical circuit as claimed in claim 7, wherein said polarization mode converter is a half-wave plate, an optical main axis of said half-wave plate forms 45° relative to a waveguide substrate.

9. A no polarization dependent waveguide type optical circuit as claimed in claim 8, wherein the angle defined between perpendicular line to an incident surface of light of said polarization mode converter and said S-shaped waveguide is in a range of 3 to 10°.

10. A no polarization dependent waveguide type optical circuit as claimed in claim 9, wherein a thermo-optic phase shifter is provided at least one of said connecting waveguides, and said thermo-optic phase shifter is separated on input side and output side of said polarization mode converter.

11. A no polarization dependent waveguide type optical circuit as claimed in claim 10, wherein said straight waveguide connecting said curved waveguides is tapered varying width in longitudinal direction, and the width of the tapered straight waveguide becomes maximum at a portion where said polarization mode converter is provided.

12. A no polarization dependent waveguide type optical circuit as claimed in claim 9, wherein said straight waveguide connecting said curved waveguides is tapered varying width in longitudinal direction, and the width of the tapered straight waveguide becomes maximum at a portion where said polarization mode converter is provided.

13. A no polarization dependent waveguide type optical circuit including one or more input waveguides, a first slab waveguide, in which a light propagated through said input waveguide propagates freely, an arrayed waveguide consisted of a plurality of waveguides connected to said first slab waveguide and provided a given optical path length difference respective of adjacent waveguides, a second slab waveguide connected to said array waveguide, and one or more output waveguide for forming an arrayed waveguide grating circuit, and a polarization mode converter converting a horizontally polarized light into a vertically polarized light and a vertically polarized light into a horizontally polarized light being provided in a center of an optical path of said arrayed waveguide of said arrayed waveguide grating circuit, wherein intermediate portion of said arrayed waveguide being formed with S-shaped waveguides of the same shape consisted of respectively two curved waveguides or two curved waveguides and straight waveguide connecting said curved waveguides, and one or two polarization mode converters being provided in a groove formed across said S-shaped waveguide, and a perpendicular line to an incident surface of light of said polarization mode converter and said S-shaped waveguide forms an angle greater than 0°.

14. A no polarization dependent waveguide type optical circuit as claimed in claim 13, wherein said polarization mode converter is a half-wave plate, an optical main axis of said half-wave plate forms 45° relative to a waveguide substrate.

15. A no polarization dependent waveguide type optical circuit as claimed in claim 14, wherein the angle defined between perpendicular line to an incident surface of light of said polarization mode converter and said S-shaped waveguide is in a range of 3 to 10°.

16. A no polarization dependent waveguide type optical circuit as claimed in claim 15, wherein said straight waveguide connecting said curved waveguides is tapered varying width in longitudinal direction, and the width of the tapered straight waveguide becomes maximum at a portion where said polarization mode converter is provided.

* * * * *